(12) United States Patent
Okada et al.

(10) Patent No.: US 8,599,243 B2
(45) Date of Patent: Dec. 3, 2013

(54) IMAGE PROCESSING DEVICE, IMAGE PROCESSING METHOD, AND PROGRAM

(75) Inventors: Shunji Okada, Kanagawa (JP); Yukio Isobe, Kanagawa (JP); Naoki Morimoto, Tokyo (JP); Atsushi Mae, Kanagawa (JP); Eiji Tadokoro, Chiba (JP); Hideo Obata, Kanagawa (JP)

(73) Assignee: Sony Corporation (JP)

( * ) Notice: Subject to any disclaimer, the term of this patent is extended or adjusted under 35 U.S.C. 154(b) by 454 days.

(21) Appl. No.: 12/802,680

(22) Filed: Jun. 11, 2010

(65) Prior Publication Data

US 2011/0007135 A1  Jan. 13, 2011

(30) Foreign Application Priority Data

Jul. 9, 2009  (JP) ................. P2009-162341

(51) Int. Cl.
*H04N 13/02* (2006.01)
(52) U.S. Cl.
USPC .......................................................... 348/46
(58) Field of Classification Search
USPC .......................................................... 348/46
See application file for complete search history.

(56) References Cited

U.S. PATENT DOCUMENTS

| | | | |
|---|---|---|---|
| 2004/0095999 A1* | 5/2004 | Piehl et al. | 375/240.16 |
| 2004/0125447 A1* | 7/2004 | Sato et al. | 359/462 |
| 2007/0273761 A1* | 11/2007 | Maruyama et al. | 348/51 |
| 2008/0002878 A1* | 1/2008 | Meiyappan | 382/154 |
| 2009/0052875 A1* | 2/2009 | Morimoto et al. | 386/131 |

FOREIGN PATENT DOCUMENTS

JP  2008-067393 A  3/2008

* cited by examiner

*Primary Examiner* — David Czekaj
*Assistant Examiner* — Nam Pham
(74) *Attorney, Agent, or Firm* — Lerner, David, Littenberg, Krumholz & Mentlik, LLP

(57) ABSTRACT

An image processing apparatus includes: an imaging unit configured to generate an imaged image by imaging a subject; a depth information generating unit configured to generate depth information relating to the imaged image; an image processing unit configured to extract, from the imaged image, an image of an object region including a particular subject out of subjects included in the imaged image and a surrounding region of the subject, based on the depth information, and generate a difference image to display a stereoscopic image in which the subjects included in the imaged image are viewed stereoscopically based on the extracted image; and a recording control unit configured to generate a data stream in which data corresponding to the imaged image and data corresponding to the difference image are correlated, and record the data stream as a moving image file.

16 Claims, 30 Drawing Sheets

| SUBJECT DISTANCE | DEPTH VALUE |
|---|---|
| 0.5 | 255 |
| 0.6 | 237 |
| 0.7 | 220 |
| 0.8 | 205 |
| 0.9 | 192 |
| 1.0 | 180 |
| 1.5 | 135 |
| 2.0 | 100 |
| 2.5 | 78 |
| 3.0 | 58 |
| 3.5 | 40 |
| 4.0 | 25 |
| 4.5 | 12 |
| 5.0 | 0 |

| CHAPTER ID | #1 | #2 | #3 | #4 | #5 | #6 | #7 | #8 |
|---|---|---|---|---|---|---|---|---|
| 431 — PLAYING LIST REGISTRATION INFORMATION | ... | ... | ... | ... | ... | ... | ... | ... |
| 432 — STEREOSCOPIC IMAGE IDENTIFICATION INFORMATION | 1 | 1 | 1 | 0 | 1 | 1 | 1 | 0 |
| 433 — DEPTH MAP PRESENCE/ABSENCE INFORMATION | 1 | 1 | 1 | 0 | 1 | 1 | 1 | 0 |

FIG. 12

| FILE TYPE | MAXIMUM NUMBER | ROLE |
|---|---|---|
| index | 1 | A FILE WHICH CENTRALLY MANAGES THE OVERALL MEDIA. MANAGES THE CORRELATION BETWEEN TITLES TO SHOW THE USER AND Movie Object FILES. WITH THE AVCHD FORMAT, Movie Object FILES ARE GENERATED BUT NOT REFERENCED. THE RELATION BETWEEN THE TITLES AND PLAY ORDER WHICH ORIGINALLY SHOULD BE MANAGED BY Movie Object FILES IS MANAGED BY FORMAT WITHIN METADATA OF THE index FILE |
| Movie Object | 1 | A FILE WHICH MANAGES A PLAYLIST PLAYED CORRESPONDING TO A TITLE BEING SPECIFIED IN THE BD FORMAT. WITH THE AVCHD FORMAT, THIS FILE IS NOT REFERENCED WHEN PERFORMING PLAYING STREAM ACCESS OF ITSELF, BUT AT THE TIME OF RECORDING, THE RELATION BETWEEN THE TITLES AND PLAY ORDER PLAYLIST IS GENERATED IN ACCORDANCE WITH THE BD FORMAT. |
| Real PlayList | 1000 | A PLAYLIST FOR PLAYING ORIGINAL TITLES. VIDEO FILES TO BE RECORDED/PLAYED ARE RECORDED FROM ONE START TO STOP OF RECORDING AS ONE CHAPTER TITLE AND ONE FILE, WITH EACH TITLE BEING REGISTERED AS AN ORIGINAL TITLE IN ORDER OF RECORDING. |
| Virtual PlayList | 1000 | A VIRTUAL PLAYING PLAYLIST USED IN THE CASE OF REALIZING A PLAY ORDER OPTIONALLY INSTRUCTED BY THE USER WITH NON-DESTRUCTIVE EDITING IN THE AVCHD FORMAT. HOWEVER, WITH THE PRESENT EMBODIMENT, THIS AVCHD VIRTUAL PLAYING PLAYLIST (Virtual PlayList) IS NOT USED IN AVCHD FORMAT SHOOTING. A CONFIGURATION IS USED WHEREIN AN Index DATABASE FILES OF A FORMAT MORE FLEXIBLE THAN SPECIFYING A STREAM ACCESS POSITION BY TITLE AND VIDEO TIMESTAMP POINT-IN-TIME LIST IS PROVIDED, OPERATION FUNCTIONS OF A User Interface OF WHICH FUNCTION DESIGNS ARE CHANGED SEPARATELY FOR EACH PRODUCT MODEL ARE INSTANTANEOUSLY HANDLED, AND THE PLAY ORDER IS VIRTUALLY SPECIFIED BY SPECIFYING TITLES AND A POINT-IN-TIME LIST IN THE DATABASE. |
| Clip Information | 4000 | FORMS A PAIR WITH AN AV STREAM FILE, AND HAS DESCRIBED THEREIN ENTRY POINT MAP INFORMATION RELATING TO A STREAM USED TO ACCESS A SPECIFIED POINT IN A STREAM RECORDED IN THE MEDIA, AT THE TIME OF PLAYING AN ACTUAL STREAM. |
| Clip AV Stream | 4000 | A FILE STORING A STREAM RECORDED IN MPEG-TS FORMAT. A MOVING IMAGE STREAM IS AN ELEMENTARY STREAMS OF GOPS CONFIGURING A SYSTEM STREAM ALONG WITH AN AUDIO STREAM, WHICH IS RECORDED. A Modified DV Pack IS INCLUDED EVERY SO MANY EP (Entry Point) UNITS MADE UP OF AN INTEGER NUMBER OF GOPS, AND ATTRIBUTE INFORMATION RELATING TO SHOOTING CONDITIONS AND STEREOSCOPIC IMAGES IS DESCRIBED THEREIN. AT THE TIME OF SHOOTING AND RECORDING, A LOGICAL POSITION WRITTEN IN THE MEDIA OF EACH GOP IS REGISTERED IN THE Clip Information FILE AS AN EP MAP. ALSO, AT THE TIME OF PLAYING, A LOGICAL POSITION ON THE MEDIA SPECIFIED BY THE EP MAP IS ACCESSED AND READ OUT FROM THE Clip Information FILE. |

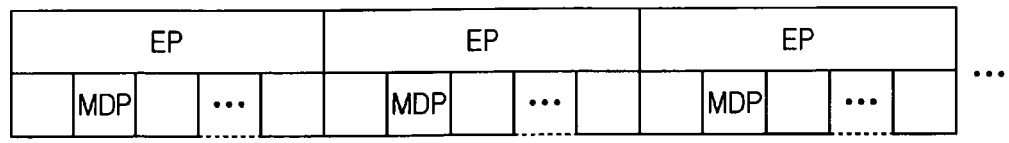
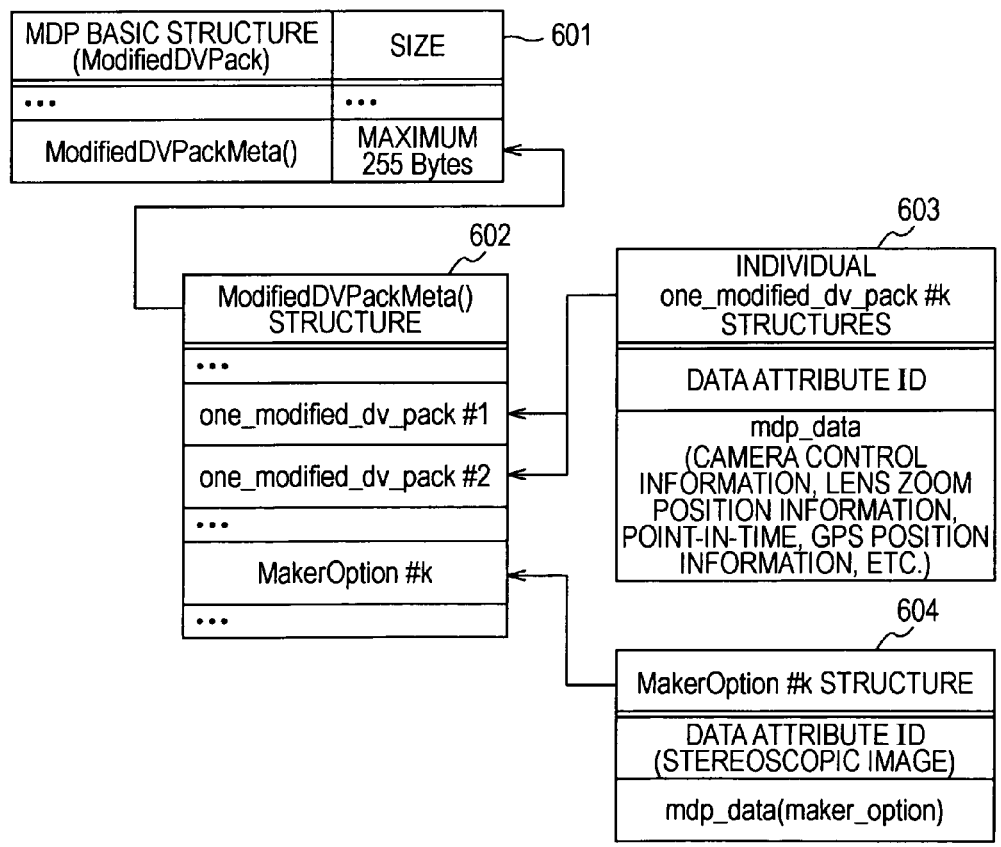

FIG. 27A
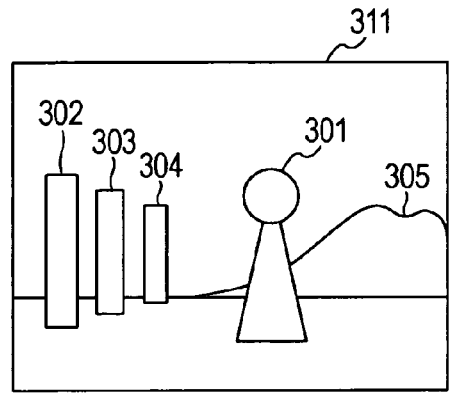
FIG. 27B
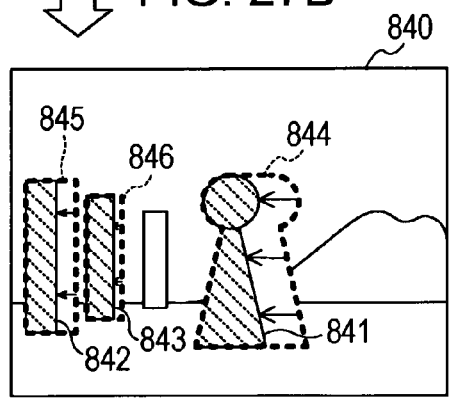
FIG. 27C
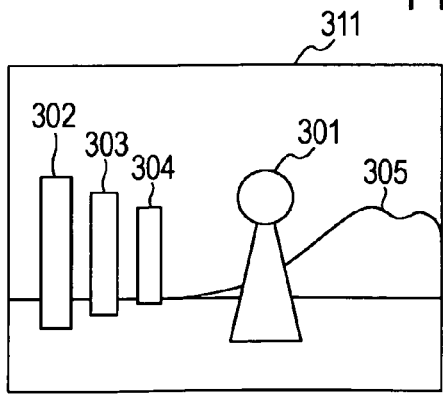
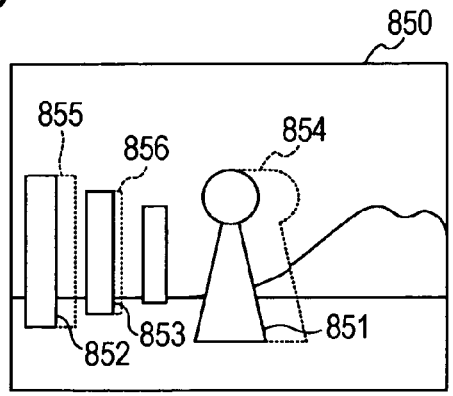

IMAGE PROCESSING DEVICE, IMAGE PROCESSING METHOD, AND PROGRAM

CROSS-REFERENCE TO RELATED APPLICATION

The present application claims priority from Japanese Patent Application No. JP 2009-162341 filed in the Japanese Patent Office on Jul. 9, 2009, the entire content of which is incorporated herein by reference.

BACKGROUND OF THE INVENTION

1. Field of the Invention

The present invention relates to an image processing device, and particularly relates to an image processing device which performs image processing for stereoscopy of moving images, an image processing method, and a program for causing a computer to execute the program.

2. Description of the Related Art

Heretofore, various stereoscopic image display methods for displaying a stereoscopic image in which the parallax of the left and right eyes is used to obtain a three-dimensional sensation. For example, a stereoscopic image display method has been proposed wherein a stereoscopic image configured of a left eye viewing image and right eye viewing image is displayed, and viewed stereoscopically using polarizing eyeglasses. Also, in recent years, stereoscopic image display methods wherein an image can be viewed stereoscopically without using polarizing eyeglasses have been proposed. For example, stereoscopic image display methods such as the parallax barrier method, lenticular lens method, multi-view methods such as super-multi-view, and so forth, have been proposed.

Also, there have been proposed imaging apparatuses such as digital still cameras and digital video cameras (camera-integrated recorders) and so forth, which record moving images for displaying a stereoscopic image as image data. For example, an optical disc recording device which records a left eye viewing image and a right eye viewing image for displaying a stereoscopic image, as video streams (e.g., Japanese Unexamined Patent Application Publication No. 2008-67393 (FIG. 1)).

SUMMARY OF THE INVENTION

According to the related art described above, images making up the moving image can be sequentially displayed as stereoscopic images when playing the recorded moving image. However, in the case of recording the image data of the moving image for displaying the stereoscopic image with the above-described related art, for example, left eye viewing images and right eye viewing images, in which an almost-identical subject is recorded at exactly the same time, are sequentially recorded. In the event of recording in this way, the storage amount of the image data relating to the stereoscopic image is great as compared to recording image data for a flat image (two-dimensional image moving image).

Now, in recent years, the size of imaging apparatuses is becoming smaller so as to allow users to carry the apparatuses more easily, and accordingly the size of the recording media in the imaging apparatuses is also being reduced. For example, there may be cases where a user takes such an imaging apparatus on a trip, and records image data relating to stereoscopic images at various locations on the trip. However, recording media in such imaging apparatuses often have a small storage capacity for storing various types of data. Accordingly, it can be assumed that the amount of time for recording will be shorter when recording image data relating to stereoscopic images. Thus, it is important to reduce the storage size of moving images for displaying stereoscopic images.

It has been found desirable to suitably record moving images for displaying stereoscopic images.

According to an embodiment of the present invention, an image processing apparatus includes: an imaging unit configured to generate an imaged image by imaging a subject; a depth information generating unit configured to generate depth information relating to the imaged image; an image processing unit configured to extract, from the imaged image, an image of an object region including a particular subject out of subjects included in the imaged image and a surrounding region of the subject, based on the depth information, and generate a difference image to display a stereoscopic image in which the subjects included in the imaged image are viewed stereoscopically based on the extracted image; and a recording control unit configured to generate a data stream in which data corresponding to the imaged image and data corresponding to the difference image are correlated, and record the data stream as a moving image file. An image processing method and a program for causing a computer to execute the image processing method, according to an embodiment of the present invention, produce the same effects as the image processing apparatus. This produces the operations of extracting, from an imaged image, an image of an object region including a particular subject out of subjects included in the imaged image and a surrounding region of the subject, based on depth information, generating a difference image based on the extracted image, generating a data stream in which data corresponding to the imaged image and data corresponding to the difference image are correlated, and recording the data stream as a moving image file.

The image processing unit may determine a subject existing within a predetermined range from the imaging position of the imaged image to be the particular subject, based on the depth information, determine the surrounding region in the horizontal direction of the imaged image of the particular subject, based on the depth information relating to the particular subject, and extract an image of the particular region from the imaged image. This produces the effects of determining a subject based on the depth information, determining the surrounding region in the horizontal direction of the imaged image of the particular subject, based on the depth information relating to the particular subject, and extracting an image of the particular region from the imaged image.

The imaging unit may generate a first imaged image and a second imaged image for displaying the stereoscopic image; with the depth information generating unit generating depth information relating to the second imaged image; the image processing unit extracting, from the second image, an object region including a particular subject out of subjects included in the second imaged image and a surrounding region of the subject, based on the depth information relating to the second imaged image, and generating the difference image based on the extracted image; and the recording control unit generating the data stream by correlating data corresponding to the first imaged image and data corresponding to the difference image. This produces the effects of generating a first imaged image and a second imaged image, generating depth information relating to the second imaged image, extracting from the second image an object region based on the depth information, generating a difference image based on the extracted image, and generating a data stream by correlating data corresponding to the first imaged image and data corresponding to the difference image.

The recording control unit may generate the data stream including stereoscopic image identification information indicating that data corresponding to the difference image is to be included. This produces the effects of generating a data stream including stereoscopic image identification information.

The recording control unit may generate, according to the AVCHD Standard, the data stream including the stereoscopic image identification information in a modified digital video pack according to the AVCHD Standard. This produces the effects of generating, according to the AVCHD Standard, a data stream including stereoscopic image identification information in a modified digital video pack according to the AVCHD Standard.

The recording control unit may record a moving image management file managing the moving image file, including stereoscopic image identification information indicating that data corresponding to the difference image is included in the moving image file. This produces the effects of recording a moving image management file, including stereoscopic image identification information in the moving image management file.

The recording control unit may record a moving image management file including the stereoscopic image identification information in at least one of an index file, a clip information file, and a movie playlist file, according to the AVCHD Standard. This produces the effects of recording a moving image management file including stereoscopic image identification information in at least one of an index file, a clip information file, and a movie playlist file, according to the AVCHD Standard.

The recording control unit may generate the data stream correlating data corresponding to the imaged image and data corresponding to the difference image and data corresponding to the depth information. This produces the effects of generating a data stream correlating data corresponding to an imaged image and data corresponding to a difference image and data corresponding to depth information.

The recording control unit may generate the data stream including depth map presence/absence information indicating that data corresponding to the depth information is to be included. This produces the effects of generating a data stream including depth map presence/absence information.

The recording control unit may generate, according to the AVCHD Standard, the data stream including the depth map presence/absence information in a modified digital video pack according to the AVCHD Standard. This produces the effects of generating, according to the AVCHD Standard, a data stream including depth map presence/absence information in a modified digital video pack according to the AVCHD Standard.

The recording control unit may record a moving image management file managing the moving image file, including depth map presence/absence information indicating that the moving image file includes data corresponding to the depth information. This produces the effects of including depth map presence/absence information in a moving image management file and recording the moving image management file.

The recording control unit may record a moving image management file including the depth map presence/absence information in at least one of an index file, a clip information file, and a movie playlist file, according to the AVCHD Standard. This produces the effects of recording a moving image management file including depth map presence/absence information in at least one of an index file, a clip information file, and a movie playlist file, according to the AVCHD Standard.

The recording control unit may define a registration region for a play item of the depth information in an extended data region in a movie playlist file according to the AVCHD Standard, and record the play item of the depth information in the registration region. The produces the effects of defining a registration region for a play item of depth information in an extended data region in a movie playlist file according to the AVCHD Standard, and recording the play item of the depth information in the registration region.

The image processing apparatus may further include: an image registration unit configured to restore a first image making up the stereoscopic image, based on the imaged image and the difference image included in the moving image file; and a stereoscopic image generating unit configured to generate the stereoscopic image based on the restored first image and the imaged image. This produces the effects of restoring a first image making up a stereoscopic image, based on the imaged image and the difference image included in the moving image file, and generating the stereoscopic image based on the restored first image and the imaged image.

The imaging unit may generate a first imaged image and a second imaged image for displaying the stereoscopic image, as the imaged image, with the recording control unit correlating a first thumbnail image corresponding to the first imaged image and a second thumbnail image corresponding to the second imaged image, for displaying a representative image representing the moving image file as a stereoscopic image, and records in a moving image management file managing the moving image file. This produces the effects of correlating a first thumbnail image and a second thumbnail image for displaying a representative image representing the moving image file as a stereoscopic image, and recording in a moving image management file.

The image processing apparatus may further include a display control unit configured to perform a list display of a representative image representing the moving image file, based on the first thumbnail image and the second thumbnail image recorded in the moving image management file. This produces the effects of performing a list display of a representative image representing a moving image file, based on a first thumbnail image and a second thumbnail image recorded in a moving image management file.

The above configurations are advantageous in that moving images for displaying stereoscopic images can be suitably recorded.

BRIEF DESCRIPTION OF THE DRAWINGS

FIG. 12 is a diagram schematically illustrating the correlation of the types of AVCHD files and the roles thereof;

FIGS. 15A through 15C are diagrams illustrating the data structure of a modified digital video pack in general under the AVCHD Standard;

FIGS. 27A through 27C are diagrams schematically illustrating a stereoscopic image generating method in a case of the image processing unit according to the second embodiment of the present invention generating a right eye viewing image from an imaged image;

DESCRIPTION OF THE PREFERRED EMBODIMENTS

Embodiments for carrying out the present invention (hereinafter referred to simply as "embodiments") will be described. Description will proceed in the following order.

1. First Embodiment (Recording control of stereoscopic image: Example of generating a stereoscopic difference image and recording a moving image file including this stereoscopic difference image)

2. Second Embodiment (Display control of stereoscopic image: Example of generating and displaying a simple stereoscopic image)

3. Third Embodiment (Recording control and display control of thumbnail image: Recording example for displaying thumbnail images as a stereoscopic images, and display example of the thumbnail images)

1. First Embodiment

Configuration Example of Imaging Apparatus

Figure 1:
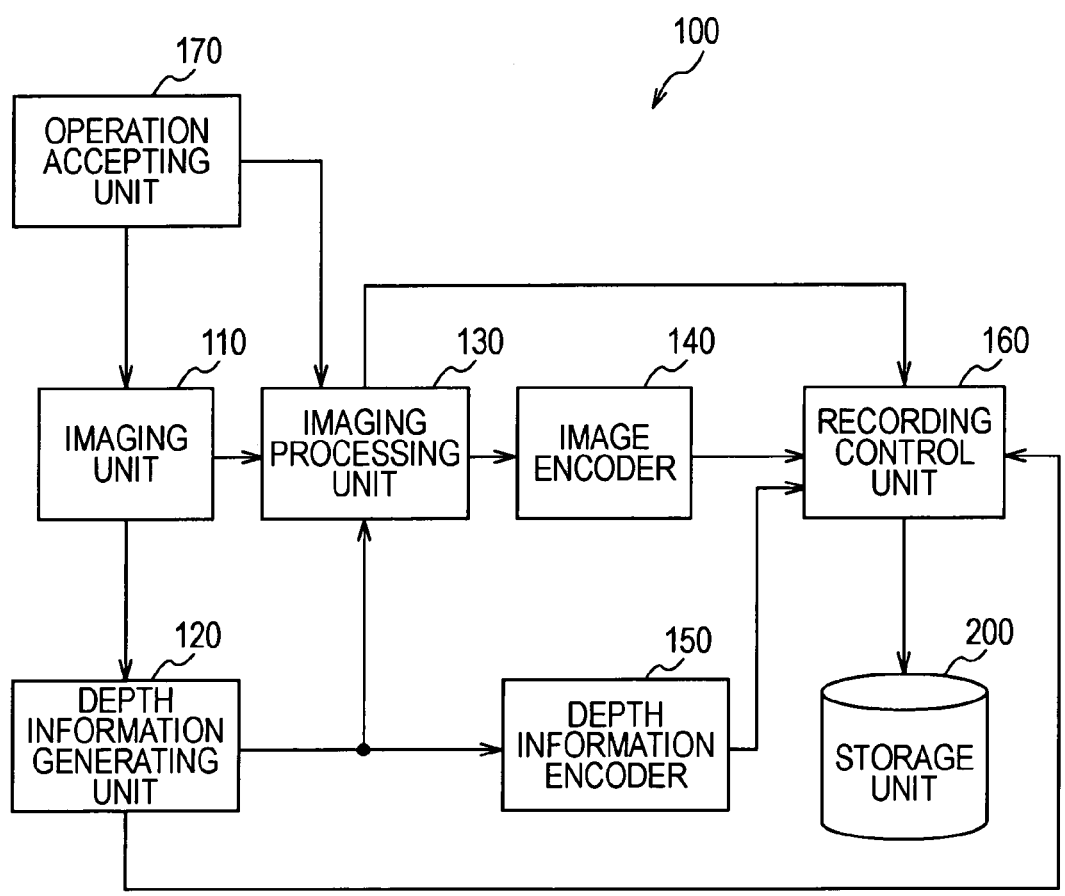
FIG. 1 is a block diagram illustrating a functional configuration example of an imaging apparatus according to a first embodiment of the present invention.

FIG. 1 is a block diagram illustrating a functional configuration example of an imaging apparatus 100 according to a first embodiment of the present invention. The imaging apparatus 100 includes an imaging unit 110, a depth information generating unit 120, an image processing unit 130, an image encoder 140, a depth information encoder 150, a recording control unit 160, an operation accepting unit 170, and a storage unit 200.

The imaging unit 110 is an imaging unit capable of handling stereoscopy imaging, which generates two imaged images (image data) by imaging a subject in accordance with operation input from the operation accepting unit 170, and outputs the two generated imaged images to the depth information generating unit 120 and the image processing unit 130. The two imaged images are an image for the left eye (left eye viewing image) and an image for the right eye (right eye viewing image) for displaying a stereoscopic image. The imaging unit 110 also outputs the position and focal position of each lens to the depth information generating unit 120. Note that the internal configuration of the imaging unit 110 will be described in detail with reference to FIG. 2.

The depth information generating unit 120 generates depth maps regarding the two imaged images output from the imaging unit 110, and outputs the generated depth maps to the image processing unit 130 and depth information encoder 150. Also, the depth information generating unit 120 outputs, to the recording control unit 160, depth map generation information indicating that depth maps have been generated regarding the imaged images. Note that a depth map is data indicating the depth from the imaging position (e.g., from the position of the imaging apparatus 100) to the subject in the imaged image (i.e., subject distance). Examples of techniques which can be used for generating depth maps include TOF (Time Of Flight) and defocus analysis (Depth from Defocus). For example, TOF is a technique wherein the distance to the subject is measured by reflecting light emitted from a light source off of the subject, and the distance is calculated based on the delay of light reaching the sensor, and the speed of light. Note that a method for generating a depth map with the first embodiment will be described later in detail with reference to FIG. 3.

The image processing unit 130 generates a stereoscopic difference image for one of the two imaged images output from the imaging unit 110 in accordance with operation input from the operation accepting unit 170, based on the depth map output from the depth information generating unit 120. The image processing unit 130 then outputs the generated stereoscopic difference image, and the other imaged image of the two imaged images output from the imaging unit 110 (i.e., outputs a stereoscopic main image), to the image encoder 140. Also, in the event of having generated a stereoscopic difference image and a stereoscopic main image, the image processing unit 130 outputs stereoscopic image generation information to the recording control unit 160. It should be noted that a stereoscopic difference image is an image for displaying a stereoscopic image, and the original image can be generated by using the stereoscopic main image. Note that generating of stereoscopic parallax images will be described in detail with reference to FIGS. 6A through 9C.

The image encoder 140 encodes the stereoscopic main image and stereoscopic difference image (i.e., digital video data) output from the image processing unit 130, and outputs the encoded stereoscopic main image and stereoscopic difference image to the recording control unit 160. For example, the image encoder 140 performs compression encoding of the digital video data output from the image processing unit 130 according to a predetermined compression encoding method, and supplies the compression-encoded digital video data to the recording control unit 160 as an AV stream. With the present embodiment, a case of using H.264/MPEG-4 AVC, which is capable of highly efficient encoding as the moving image compression encoding method in the event of employing the AVCHD Standard moving image recording format. In the event of using this method, for example, in-frame compression is performed by DCT (Discrete Cosine Transform) and in-screen prediction. Thereupon, intra-frame compression using motion vectors is performed, and moreover, entropy encoding is performed to improve compression efficiency. For the stereoscopic main image and stereoscopic difference image, images subjected to synchronization processing (known as genlock). Also, at the time of encoding, the same PTS (Presentation Time Stamp) is provided to the stereoscopic main image and stereoscopic difference image output from the image processing unit 130. PTS is a timestamp used for synchronizing when playing moving images.

The depth information encoder 150 encodes the depth maps output from the depth information generating unit 120, and outputs the encoded depth maps to the recording control unit 160. For example, the depth information encoder 150 performs compression encoding of the digital data output from the depth information generating unit 120 according to a predetermined compression encoding method, and supplies the compression-encoded digital data to the recording control unit 160 as an AV stream.

The recording control unit 160 takes the AV stream output from the image encoder 140 and the AV stream output from the depth information encoder 150 and multiplexes these two into a single AV stream according to a predetermined method, and records in the storage unit 200 as a moving image file. For example, the recording control unit 160 multiplexes the AV stream, and stores the multiplexed AV stream in a stream buffer on the fly. For example, in the event of employing the AVCHD Standard moving image recording format, multiplexing is performed following MPEG-2 TS (Transport Stream). The recording control unit 160 monitors the amount of data stored in the stream buffer, and upon a predetermined amount of more of data being stored in the stream buffer, reads out a recording unit worth of data for the storage unit 200 from the stream buffer and writes this to the storage unit 200. That is to say, the recording control unit 160 forms a moving image file of the AV stream stored in the stream buffer, and stores this in the storage unit 200. Also, the recording control unit 160 includes stereoscopic image identification information and depth map presence/absence information in the AV stream, based on the stereoscopic image generation information output from the image processing unit 130 and the depth map generation information output from the depth information generating unit 120. In the same way, the recording control unit 160 includes the stereoscopic image identification information and depth map presence/absence information in a moving image management file and records in the storage unit 200. These recording methods will be described later in detail with reference to FIGS. 10A through 20.

The operation accepting unit 170 is an operation accepting unit which accepts operation input from the user, and outputs operations contents corresponding to the accepted operation into to the imaging unit 110 and image processing unit 130. For example, in the event that a setting operation for setting the stereoscopic image imaging mode for recording a moving image to display a stereoscopic image, the operation accepting unit 170 performs output to the imaging unit 110 and image processing unit 130 to that effect. In the event that a pressing operation pressing a recording button is accepted in a state wherein the stereoscopic image imaging mode is set, the operation accepting unit 170 performs output to the imaging unit 110 and image processing unit 130 to that effect.

The storage unit 200 is a storage unit for storing information of moving image files and the like, based on recording control of the recording control unit 160. For example, the storage unit 200 stores the AV stream (data stream) generated by multiplexing the digital video data output from the image encoder 140 and the digital data output from the depth information encoder 150, as a moving image file. Also, the storage unit 200 stores a moving image management file which manages the moving image file. Note that the storage unit 200 may be built into the imaging apparatus 100, or may be configured detachably from the imaging apparatus 100. Further, various types of media can be used as the storage unit 200, such as semiconductor memory, optical recording media, magnetic disks, HDD (Hard Disk Drive), and so forth. Note that examples of an optical recording medium include recordable DVD (Digital Versatile Disc), recordable CD (Compact Disc), Blu-ray disc (a registered trademark), and so forth.

Configuration Example of Imaging Unit and Example of Generating Imaged Image

Figure 2A:
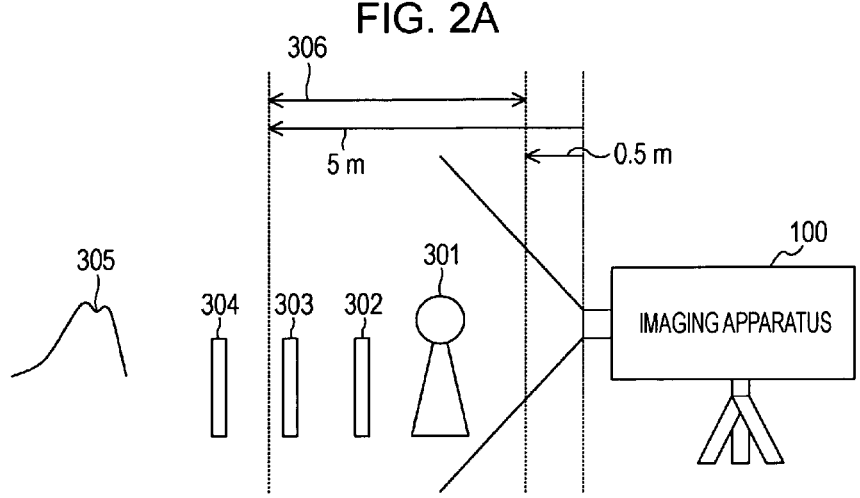
FIGS. 2A through 2C are diagrams illustrating an internal configuration example of an imaging unit according to the first embodiment of the present invention, and an imaged image generated by the imaging unit.
Figure 2B:
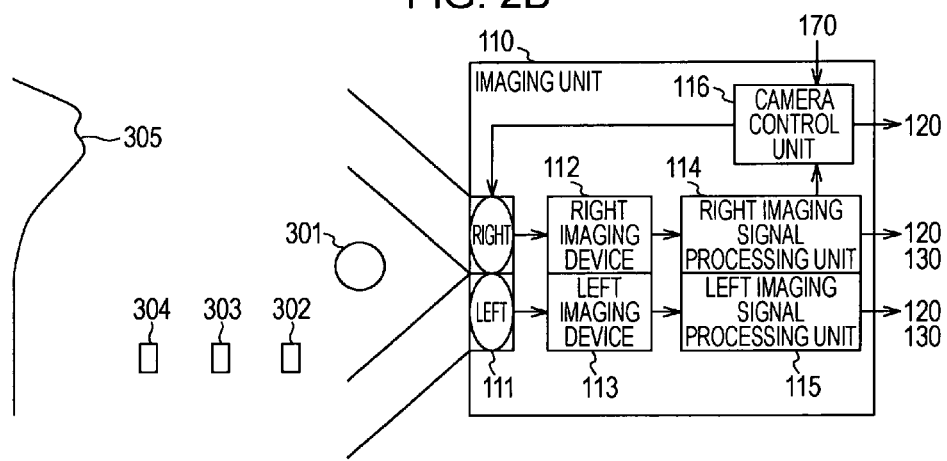
Figure 2C:
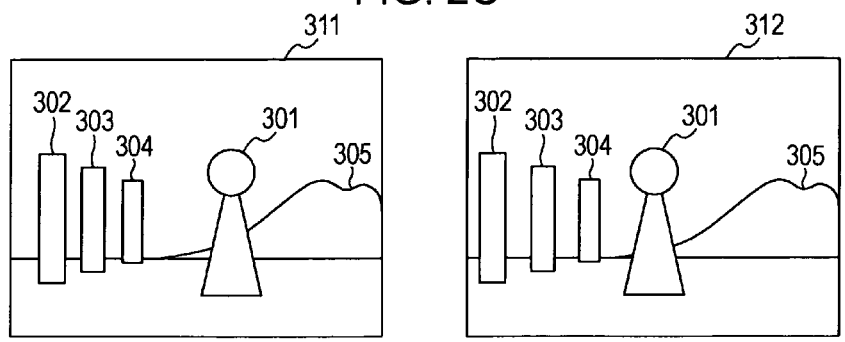

FIGS. 2A through 2C are diagrams illustrating an example of the internal configuration of the imaging unit 110 according to the first embodiment of the present invention, and an example of an imaged image generated by the imaging unit 110. FIG. 2A schematically illustrates the relation between the imaging apparatus 100 and the subject as viewed from the side. FIG. 2B schematically illustrates the relation between the imaging apparatus 100 and the subject with the state in FIG. 2A being viewed from above, and an example of the internal configuration of the imaging unit 110. FIG. 2C illustrates an example of imaged images generated by the placement shown in FIGS. 2A and 2B. In this example, two imaged images are generated at the same time wherein a person 301, posts 302 through 304 erected from the ground, and a mountain 305, are subjects.

In the example shown in FIG. 2A, we will say that the zoom position of a lens unit 111 of the imaging apparatus 100 is set at the wide end. In this case, the person 301 and posts 302 and 303 exist within a range of 0.5 m to 5.0 m (specified subject extracting section 306) from the imaging apparatus 100, where stereoscopic sensation due to parallax in the picture is most readily sensed. On the other hand, the post 304 and mountain 306 are at a subject distance in a range exceeding 5.0 m.

As shown in FIG. 2B, the imaging unit 110 includes a lens unit 111, a right imaging device 112, a left imaging device 113, a right imaging signal processing unit 114, a left imaging signal processing unit 115, and a camera control unit 116. Now, the imaging unit 110 is configured such that there are provided, for each of the left and right, a lenses of the lens unit 111, an imaging device, and an imaging signal processing unit, as one set each, so as to generate right eye viewing images and left eye viewing images for displaying stereoscopic images. In FIG. 2B, with the imaging unit 110, the lens of the lens unit 111 for generating the right eye viewing images is denoted with the word "RIGHT" in an oval. The imaging device and imaging signal processing unit for generating right eye viewing images are each shown as the right imaging device 112 and right imaging signal processing unit 114. On the other hand, the lens of the lens unit 111 for generating the left eye viewing images is denoted with the word "LEFT" in an oval. The imaging device and imaging signal processing unit for generating left eye viewing images are each shown as the left imaging device 113 and left imaging signal processing unit 115. Note that the configurations of the left and right lenses of the lens unit 111, the right imaging device 112 and left imaging device 113, and the right imaging signal processing unit 114 and left imaging signal processing unit 115, are the same except for the placement thereof. Accordingly, in the following description, one of the left or right configurations will be described, and description of the other will be omitted.

The lens unit 111 is an optical system having multiple lenses for condensing light from the subject (including zoom lenses and focusing lenses), and a diaphragm (not shown) for adjusting the amount of light passing through these lenses (i.e., exposure) in accordance with the subject illuminance. The condensed subject light is output to the right imaging device 112 and left imaging device 113. That is to say, light condensed from the subject is output from the right lens to the right imaging device 112, and light condensed from the subject is output from the left lens to the left imaging device 113.

The right imaging device 112 and left imaging device 113 are imaging devices which are driven synchronously to generate image signals by forming images of subject images input via the lens unit 111. That is to say, the right imaging device 112 is a right eye imaging device which generates analog image signals in accordance with the amount of light received, by performing photoelectric conversion of the light received from the subject which is input via the right lens. Also, the left imaging device 113 is a left eye imaging device which generates analog image signals in accordance with the amount of light received, by performing photoelectric conversion of the light received from the subject which is input via the left lens. The analog image signals generated by the right imaging device 112 are supplied to the right imaging signal processing unit 114, and the analog image signals generated by the left imaging device 113 are supplied to the left imaging signal processing unit 115. Examples of imaging devices which can be used include solid-state imaging devices such as CCDs (Charge Coupled Devices) and CMOS (Complementary Metal Oxide Semiconductor).

The right imaging signal processing unit 114 is a right eye imaging signal processing unit which performs various types of signal processing on image signals output from the right imaging device 112. Also, the left imaging signal processing unit 115 is a left eye imaging signal processing unit which performs various types of signal processing on image signals output from the left imaging device 113. The image signals (image data) subjected to signal processing is output to the camera control unit 116 and image processing unit 130. The imaged images generated by the right imaging signal processing unit 114 and left imaging signal processing unit 115 will be described in detail with reference to FIG. 2C.

The camera control unit 116 generates control signals to be supplied to each part of the imaging unit 110, supplies the generated control signals, and performs control such as zoom control, shutter control, exposure control, and so on. For example, the camera control unit 116 generates control signals for moving a focus lens at the lens unit 111, thereby performing AF (Auto Focus) control wherein the focal position of a predetermined subject is detected. Specifically, the camera control unit 116 sets a predetermined position on an imaged image, corresponding to the image signals output from the right imaging signal processing unit 114 and left imaging signal processing unit 115, as an A1 area (distance measurement area) and performs tracking processing. The camera control unit 116 moves the focus lens along with the tracking processing to perform auto focusing control. With this auto focusing control, the left and right focus lenses of the lens unit 111 are moved synchronously. Also, the camera control unit 116 outputs the position of the zoom lenses and focus lenses of the lens unit 111 to the depth information generating unit 120.

An imaged image (left eye) 311 shown in FIG. 2C is the imaged image (left eye viewing image) corresponding to the image signals output from the left imaging signal processing unit 115 in the state shown in FIGS. 2A and 2B. Also, the imaged image (right eye) 312 shown in FIG. 2C is the imaged image (right eye viewing image) corresponding to the image signals output from the right imaging signal processing unit 114 in that state. With the first embodiment of the present invention, a stereoscopic difference image relating to the imaged image (right eye) 312 is generated, and this stereoscopic difference image and the imaged image (left eye) 311 are recorded as a moving image file for displaying a stereoscopic image. Note that generating of the stereoscopic difference image will be described in detail with reference to FIGS. 6A through 9C.

Example of Generating Depth Map

Next, a depth map generating method for generating a depth map for the imaged images generated by the imaging unit 110 will be described in detail with reference to the drawings. First, a method for calculating the distance between the imaging apparatus 100 and subject (subject distance), which is used at the time of generating the depth map, will be described.

Figure 3A:
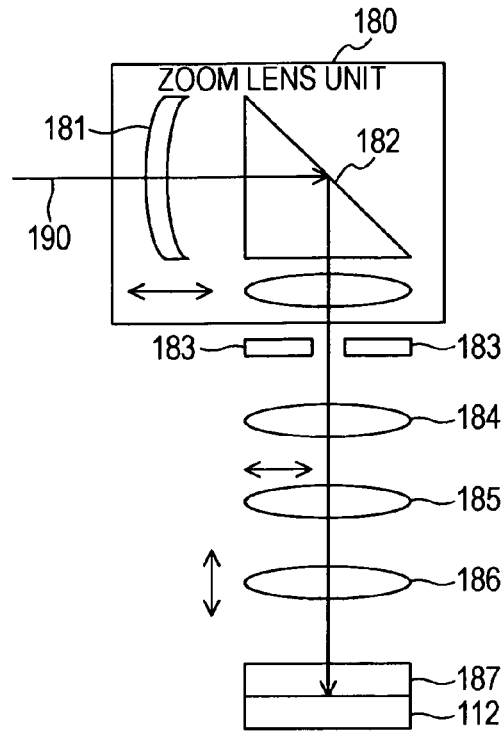
FIG. 3A is a diagram illustrating the positional relation of the imaging unit according to the first embodiment of the present invention.
Figure 3B:
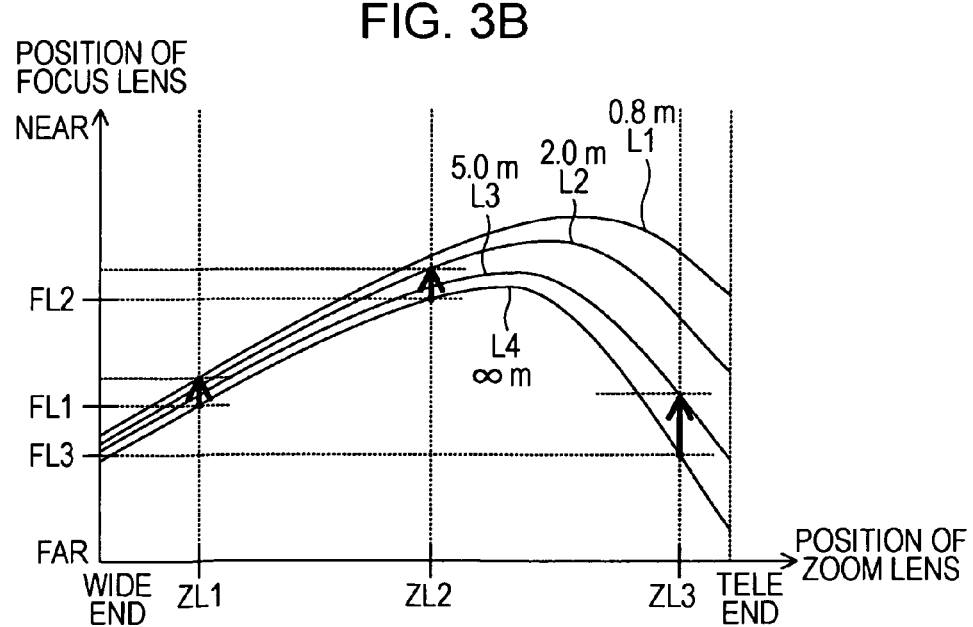
FIG. 3B is a diagram illustrating an example of property curves for identifying subject distance.

FIG. 3A is a diagram illustrating the positional relation of the imaging unit 110 according to the first embodiment of the present invention, and FIG. 3B is a diagram illustrating an example of property curves for identifying subject distance. The lens unit 111 includes a zoom lens unit 180, a diaphragm 183, a fixed lens 184, an optical shaking correction lens 185, and a focus lens 186. Also, the zoom lens unit 180 has a zoom lens 181 and an optical path folding prism 182. Also, an optical filter 187 is provided to the imaging face of the right imaging device 112. Note that in FIG. 3A, the multiple lenses provided to the lens unit 111 are simplified, with only the lenses 181 and 184 through 186 being shown.

The zoom lens 181 is a lens which moves along the optical axis direction by an actuator driven based on control signals from the camera control unit 116, to realize zoom functions. The optical path folding prism 182 is a rectangular prism for folding the light from the subject, which has been input via the zoom lens 181, by 90°. The diaphragm 183 is for adjusting the amount of light which has passed through the zoom lens 181 and optical path folding prism 182 (i.e., exposure), by opening and closing based on control signals from the camera control unit 116. The optical shaking correction lens 185 is a lens for correcting shaking of the camera by moving in a direction orthogonal to the direction in which the light is advancing, based on control signals from the camera control unit 116. The focus lens 186 is a lens for adjusting the focus (focal point) by being moved in the optical axis direction by an actuator which is driven based on control signals from the camera control unit 116, thereby realizing auto-focus functions with the focus lens 186.

FIG. 3B illustrated an example of property curves representing the relation between the subject distance, the position of the zoom lens 181 and the position of the focus lens 186. In the graph shown in FIG. 3B, the vertical axis represents the position of the focus lens 186, and the horizontal axis represents the position of the zoom lens 181. Specifically, with the vertical axis, the upper side is the near side, and the lower side is the far (infinity) side. Also, with the horizontal axis, the left side is the wide end side, and the right side is the tele end side. Note that these property curves differ among the lenses used for the imaging apparatus. With the first embodiment of the present invention, the depth information generating unit 120 holds these property curves.

The curves L1 through L4 shown in FIG. 3B are curves for identifying the subject distance between a subject in focus and the imaging apparatus 100, based on the position of the zoom lens 181 and the position of the focus lens 186. Note that the example in FIG. 3B shows four property curves L1 through L4 wherein the subject distance is within the range of 0.8 m to infinity (∞) representatively, and property curves corresponding to other subject distances are omitted from the drawing. As shown in FIG. 3B, in the event that the position of the zoom lens 181 and focus lens 186 have been obtained, the subject distance relating to the subject in focus at this time can be obtained.

Figures 4A, 4B:
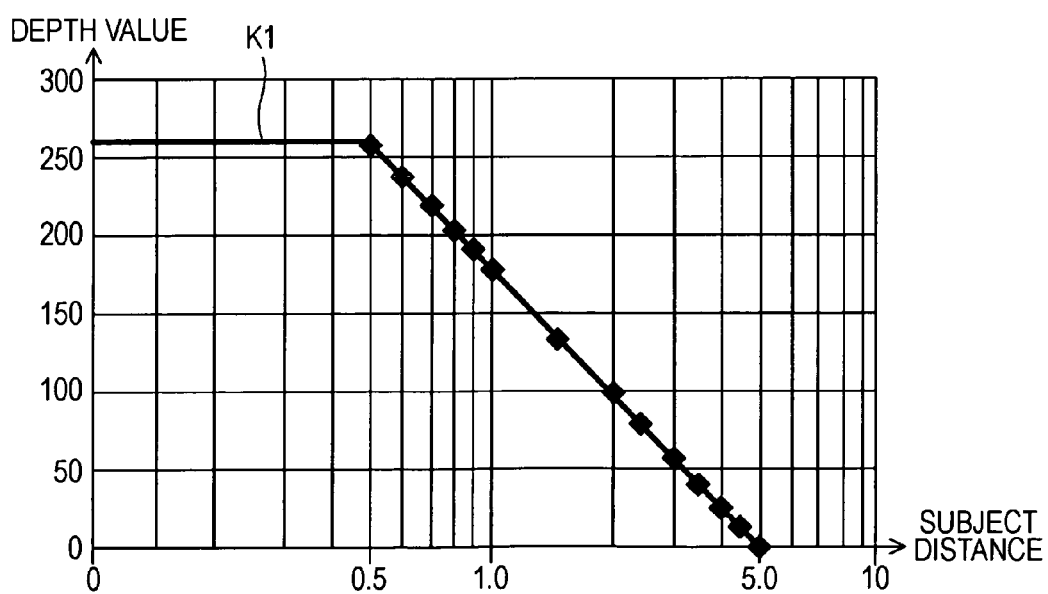
FIGS. 4A and 4B are diagrams illustrating the relation between subject distance and depth value, used by a depth information generating unit when generating a depth map in the first embodiment of the present invention.

FIGS. 4A and 4B are diagrams illustrating the relation between subject distance and depth value, used by a depth information generating unit 120 when generating a depth map in the first embodiment of the present invention. In FIG. 4A, the relation between the subject distance and depth value is illustrated in a table format, and in FIG. 4B, the relation between the subject distance and depth value is illustrated in graph form. Now, as shown in FIGS. 4A and 4B, the depth value is a value from 0 to 255, determined according to the subject distance. Also, a depth map is information (depth information) wherein the depth value determined for each pixel making up the imaged image, and the pixel position corresponding thereto, have been correlated. Using a depth map allows the subject distance of each subject included in the imaged image to be estimated.

Now, description will be made regarding depth of field. Depth of field illustrates the range of subject distances over which subjects are thought to be substantially in focus. Generally, in the event that this range is wide, the depth of field is great, and in the event that this range is narrow, the depth of field is small. It is also generally understood that the depth of field changes according to the aperture of the diaphragm. For example, the greater the aperture is, the smaller the depth of field correspondingly is, and the smaller the aperture is, the greater the depth of field correspondingly is.

For example, in the event that the aperture of the diaphragm 183 shown in FIG. 3A is set relatively small, subjects over a relatively wide range on the optical axis of the imaging apparatus 100 (near-far direction on the optical axis) are in focus. On the other hand, in the event that the aperture of the diaphragm 183 is opened relatively wide, subjects in the imaging range may not be in focus if they are but a little closer or farther on the optical axis of the imaging apparatus 100. That is to say, in the event that the depth of field is small, subjects are in focus only within a relatively narrow range regarding the near-far direction on the optical axis.

Accordingly with the first embodiment of the present invention, a case of calculating the depth value will be described as an example of using the above-described nature of subject depth.

First, an example of calculating the depth value in a state wherein the zoom lens 181 is set at the wide end side at the time of starting the imaging operations, will be described. For example, the zoom lens 181 is set at the wide end side, and the diaphragm 183 is opened wide so that the depth of field is the smallest. Making the depth of field to be the smallest with the zoom lens 181 set at the wide end side in this way makes the range of subject distances wherein subjects are thought to be in focus to be narrow. In the state of small depth of field, the focus lens 186 is set to the far side (infinity side, i.e., >5 m). With the depth of field set to be the smallest and the focus lens 186 set to the far side, the focal region of the imaged image is detected. Whether or not there is focusing can be determined using high-frequency component and low-frequency component features, and so forth. For example, contrast signals can be detected from the imaged image, and the magnitude of the signal level of the contrast signals can be used to determine whether or not there is focusing. For example, determination may be made that focus has been achieved (high focal degree) in the event that the signal level of the contrast signals is high, and that focus is off (low focal degree) in the event that the signal level of the contrast signals is low.

Thus, subjects included in a focal range when the depth of field is set to be the smallest and the focus lens 186 is set at the far side, can be estimated to be existing at a position relatively far away from the imaging apparatus 100. For example, the subject distance of a subject included in this region can be identified using the graph (property curve L4) shown in FIG. 3B. The depth information generating unit 120 assigns a depth value of "0" to the pixels included in a region of which the subject distance has been thus identified.

Next, with the depth of field set to be the smallest, the focus lens 186 is set to the near side (0.5 m), the focal region of the imaged image is detected. The depth of field is set to be the smallest and the focus lens 186 is set at the near side, and the region where the focus is achieved in the imaged image to be handled is detected. Thus, subjects included in a focal range when the depth of field is set to be the smallest and the focus lens 186 is set at the near side, can be estimated to be existing at a position relatively close to the imaging apparatus 100. For example, the subject distance of a subject included in this region can be identified to be at a closest distance (0.5 m), using the property curves shown in the graph in FIG. 3B. The depth information generating unit 120 assigns a depth value of "255" to the pixels included in a region of which the subject distance has been thus identified as being the closest distance (0.5 m).

Next, with a state in which the depth of field is set to be the smallest, the focus lens 186 is moved from the near side to the far side, while detecting focal regions in the imaged image at each position of the focus lens 186. The subject distances of the detected regions are identified by the graph in FIG. 3B, and the depth information generating unit 120 assigns depth values (0 to 255) following the relation shown in FIGS. 4A and 4B. Next, the depth information generating unit 120 generates a depth map based on the depth values obtained regarding each of the pixels making up the imaged image, and the generated depth map is output to the image processing unit 130 and depth information encoder 150.

Thus, at the time of starting imaging operations, initial settings are performed for a depth map. After the initial settings, the depth information generating unit 120 performs outline recognition processing for the subjects included in the imaged image generated by the imaging unit 110, and sequentially assigns depth values to regions within the recognized outlines. This outline recognition processing may be performed based on detected motion vectors for each subject included in the imaged image. Accordingly, a depth map can be generated for each frame making up an imaged moving image.

Description has been made above regarding an example wherein the depth values are calculated with the zoom lens 181 set at the wide end side when starting imaging operations. Now, there very well may be cases wherein zoom operations are being performed by user operations at the time of starting imaging operations. For example, in cases of shooting a person making a speech from far away, zoom operations will often be performed by user operations at the time of starting imaging operations. It is quite conceivable that one might want to view a stereoscopic image of the person giving the speech, from the imaged moving image being recorded in this way. However, in the event of recording the imaged image in this way, the zoon lens 181 is at the tele end side to begin with, so the above-described method for generating the depth map is not available at this time. Now, an example of calculating the depth value in a state wherein the zoom lens 181 is at other than the wide end position when starting imaging operations will be described.

Figure 5A:
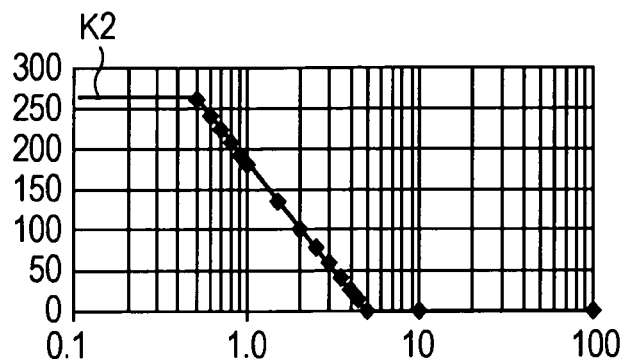
FIGS. 5A through 5C are diagrams illustrating the relation between subject distance and depth value, used by the depth information generating unit according to the first embodiment of the present invention when generating a depth map.
Figure 5B:
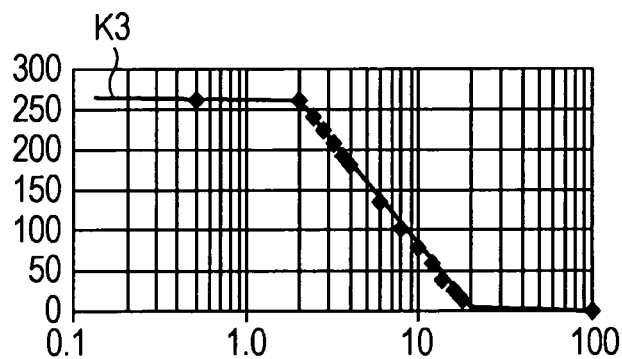
Figure 5C:
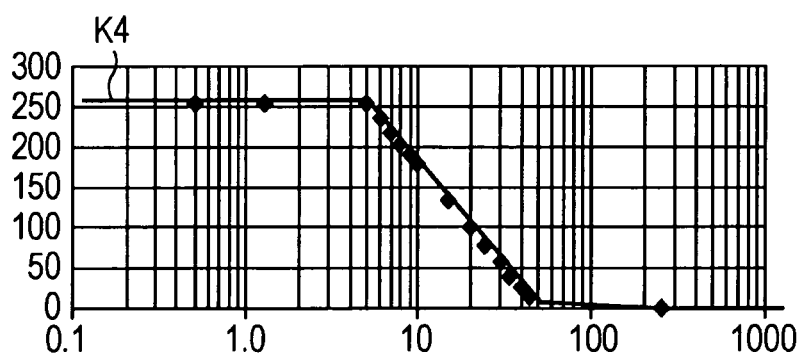

FIGS. 5A through 5C are diagrams illustrating the relation between subject distance and depth value, used by the depth information generating unit 120 according to the first embodiment of the present invention when generating a depth map. FIG. 5A is a graph illustrating the relation between subject distance and depth value in a case wherein the zoom lens 181 is situated at ZL1 on the horizontal axis of the graph shown in FIG. 3B. FIG. 5B is a graph illustrating the relation between subject distance and depth value in a case wherein the zoom lens 181 is situated at ZL2 on the horizontal axis of the graph shown in FIG. 3B. FIG. 5C is a graph illustrating the relation between subject distance and depth value in a case wherein the zoom lens 181 is situated at ZL3 on the horizontal axis of the graph shown in FIG. 3B. In the graph shown in FIG. 3B, the heavy arrows pointing to positions on the line corresponding to ZL1 through ZL3 schematically illustrating the focal range of the focus lens at each position at which the zoom lens 181 is situated. Also, which FIGS. 5A through 5C only show three patterns, K2 through k4, depth values can be obtained for various arrangements by holding four or more patterns.

Thus, even in a case wherein the zoom lens 181 is situated at a position other than the wide end, depth values can be assigned, so a depth map can be generated even if the zoom lens 181 is situated at a position other than the wide end at the time of starting imaging operations.

As described above, a depth map can be generated for each imaged image. With the first embodiment of the present invention, a depth map generated in this way is used to identify overlapping regions of the left eye viewing image and right eye viewing image, to generate a stereoscopic difference image from the right eye viewing image, and record this stereoscopic difference image and the left eye viewing image.

Example of Generating a Stereoscopic Difference Image

Figure 6A:
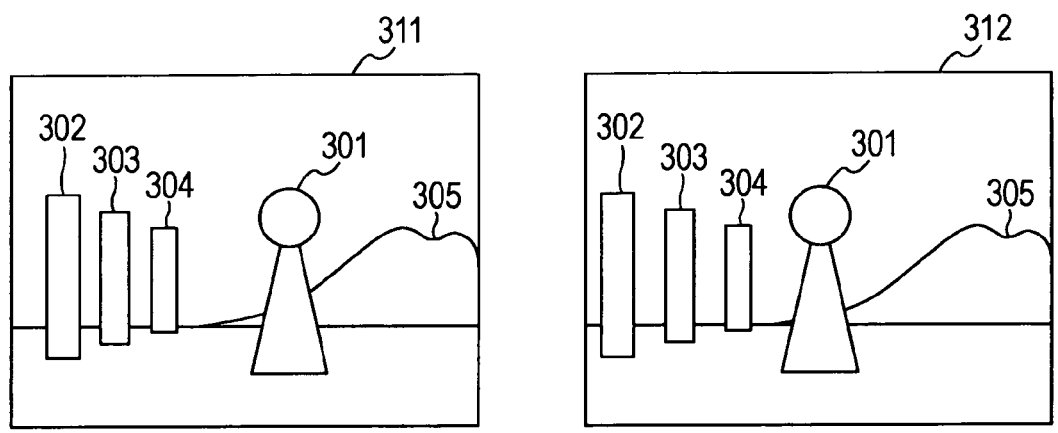
FIGS. 6A and 6B are diagrams schematically illustrating the position relation of a subject included in an imaged image (left eye) and imaged image (right eye) generated by the imaging unit according to the first embodiment of the present invention.
Figure 6B:
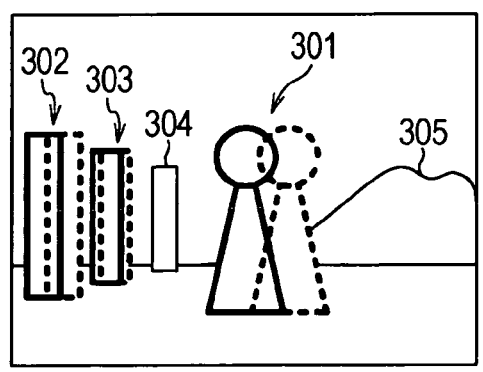

FIGS. 6A and 6B are diagrams schematically illustrating the position relation of a subject included in an imaged image (left eye) 311 and imaged image (right eye) 312 generated by the imaging unit 110 according to the first embodiment of the present invention. Note that the imaged image (left eye) 311 and imaged image (right eye) 312 shown in FIG. 6A are the same as those shown in FIG. 2C.

FIG. 6B shows a state wherein the imaged image (left eye) 311 and imaged image (right eye) 312 shown in FIG. 6A have been overlapped. Note that in the example shown in FIG. 6B, subjects of which the difference in positions in the imaged image (left eye) 311 and imaged image (right eye) 312 is relatively great are shown outlined with heavy lines. Of these heavy lines, the outline of the subjects included in the imaged image (right eye) 312 (i.e., the person 301 and posts 302 and 303) are indicated by a heavy solid line, and the subjects included in the imaged image (left eye) 311 (i.e., the person 301 and posts 302 and 303) are indicated by a heavy dotted line.

Now, of the subject regions included in the two imaged images generated at the same point-in-time, subject portions included in a range of 0.5 m to 5.0 m for example, exist at positions close to the imaging apparatus 100, and accordingly, the horizontal positions are often different. On the other hand, subject portions included in a range of 5.0 m to ∞ for example, exist at positions far away from the imaging apparatus 100, and accordingly, the horizontal positions are often generally the same. For example, as shown in FIG. 6B, of the subjects included in the imaged image (left eye) 311 and the imaged image (right eye) 312, the positions of the subjects included in a range of 0.5 m to 5.0 m (i.e., the person 301 and posts 302 and 303) differ one from another. That is to say, with the imaged image (left eye) 311, the positions of the person 301 and posts 302 and 303 in the imaged image are situated relatively toward the right, whereas with the imaged image (right eye) 312, the positions of the person 301 and posts 302 and 303 in the imaged image are situated relatively toward the left.

On the other hand, of the subjects included in the imaged image (left eye) 311 and imaged image (right eye) 312, the position of the subjects (post 304 and mountain 305) within the range of 5.0 m to ∞ have generally the same position in the imaged image. That is to say, we expect that one of the imaged image (left eye) 311 and imaged image (right eye) 312 can be restored to an imaged image which is generally the same as the original by using the other imaged image and the region of itself surrounded by heavy lines (solid and dotted) which is the close-distance subject region.

Therefore, with the first embodiment of the present invention we will take and record one of the two imaged images generated at the same point-in-time, the imaged image (left eye) 311 for example, as a stereoscopic main image. As for the other imaged image, the imaged image (right eye) 312 for example, a common region of the subject portions included in the imaged images, which are in the range of 5.0 m to ∞, are identified, and portions of this other image (imaged image (right eye) 312) which are not included in this common region, i.e., portions thereof which are in the close-distance subject region, are recorded as a stereoscopic difference image. When recording this stereoscopic difference image, the background region (region other than the close-distance subject region) is recorded as a solid color. At the time of reproducing, the background region (region other than the close-distance subject region) is used to restore the stereoscopic difference image.

Figure 7:
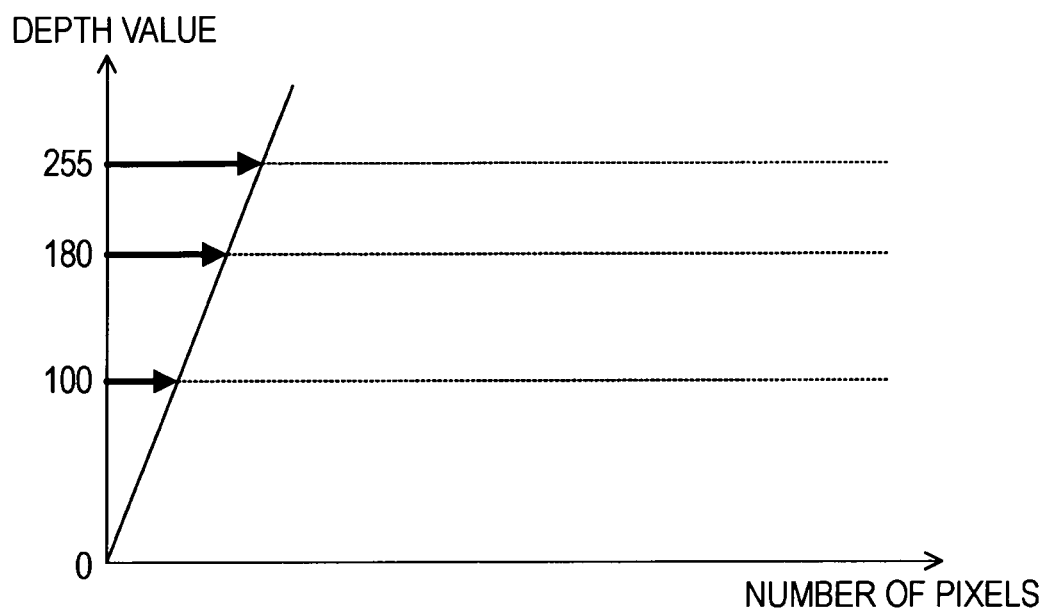
FIG. 7 is a diagram illustrating the relation between depth value of a subject relating to a stereoscopic image generated by an image processing unit according to the first embodiment of the present invention, and pixel values for identifying a recording object region including the subject.

FIG. 7 is a diagram illustrating the relation between the depth value of a subject relating to the stereoscopic difference image generated by the image processing unit 130 according to the first embodiment of the present invention, and pixel values for identifying regions to be recorded including the subject. In the graph shown in FIG. 7, the vertical axis represents the depth value calculated regarding a subject included in an imaged image, and the horizontal axis represents the length for identifying the region to be recorded, in terms of pixels.

As described above with the first embodiment according to the present invention, only images within the close-distance subject region are recorded for the stereoscopic difference image. This close-distance subject region can be calculated from the subjects in the stereoscopic difference image, using the region of subjects existing at positions relatively close to the imaging apparatus 100, and depth values corresponding to these subjects.

As shown in FIG. 6B, of the close-distance subjects included in the imaged image (right eye) 312 for example, the close-distance subject region relating to the subject (person 301) which is the closest to the imaging apparatus 100 is relatively long in the horizontal direction. Conversely, of the close-distance subjects included in the imaged image (right eye) 312, the close-distance subject region relating to the subject (post 303) which is the farthest from the imaging apparatus 100 is relatively short in the horizontal direction. Thus, the horizontal length of the region to be recorded can be determined according to the distance from the imaging apparatus 100. That is to say, the horizontal length of the region to be recorded can be calculated based on the depth values. Accordingly, a method for calculating the region to be recorded will be described in detail below with reference to the drawings.

Note that the terms "long" and "short" are used for the length of the region in the horizontal direction, rather than the terms "wide" and "narrow", since the terms "wide" and "narrow" might be misinterpreted as indicating the planar area of the region, whereas the arrangement being described here is concerned with the length thereof within the imaged image in the horizontal direction, as measured in pixels.

Figure 8A:
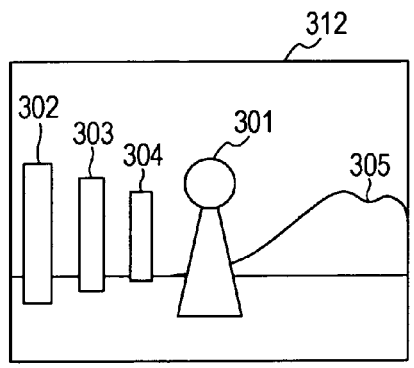
FIGS. 8A through 8F are diagrams schematically illustrating a stereoscopic image generating method in a case of the image processing unit according to the first embodiment of the present invention generating a stereoscopic difference image from an imaged image (right eye)

FIGS. 8A through 8F are diagrams schematically illustrating a stereoscopic image generating method in a case of the image processing unit 130 according to the first embodiment of the present invention generating a stereoscopic difference image from the imaged image (right eye) 312. Note that the imaged image (right eye) 312 shown in FIG. 8A are the same as that shown in FIG. 2C.

Figure 8D:
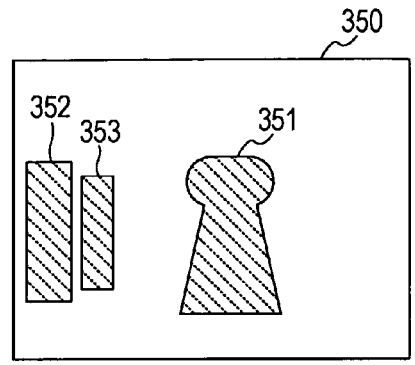
Figure 8B:
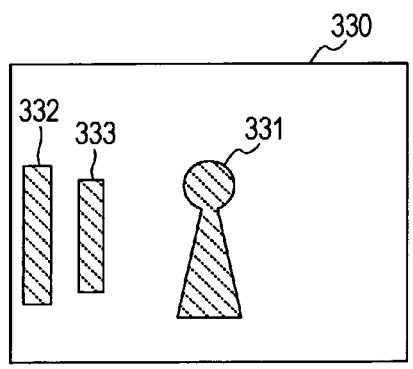

FIG. 8B illustrates just regions 331 through 333 which correspond to, of the subjects included in the imaged image (right eye) 312, the subjects at positions relatively close to the imaging apparatus 100 (i.e., the person 301 and posts 302 and 303), as hatched regions within a rectangle 330. These regions 331 through 333 are identified based on the depth map generated with regard to the imaged image (right eye) 312.

When generating a stereoscopic difference image from an imaged image, the image processing unit 130 identifies, of the subject regions included in the imaged image, the subject regions included in the range of 0.5 m to 5.0 m, based on the depth map generated based on the imaged image. For example, the image processing unit 130 identifies, of the subjects included in the imaged image (right eye) 312, the subjects included in the range of 0.5 m to 5.0 m, i.e., the person 301 and posts 302 and 303). Specifically, as shown in FIG. 8B, the image processing unit 130 identifies the regions 331 through 333 corresponding to the person 301 and posts 302 and 303, using the depth map calculated regarding the imaged image (right eye) 312.

Thus, regions of subjects relatively near the imaging apparatus 100 are recorded as a stereoscopic difference image. Now, let us assume a case of recording just the subject regions in this way and then restoring the stereoscopic difference image at the time of reproducing. In this case, it can be conceived that, of the subjects included in the imaged image (left eye) 311, the region around the close-distance subjects is not restored. Accordingly, with the first embodiment of the present invention, the region of the person 301 and posts 302 and 303 included in the imaged image (right eye) 312, and the region of the person 301 and posts 302 and 303 included in the imaged image (left eye) 311, are to be recorded. An image of these regions to be recorded is recorded as the stereoscopic difference image.

Figure 8E:
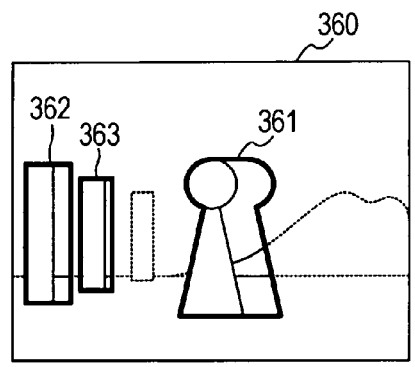
Figure 8C:
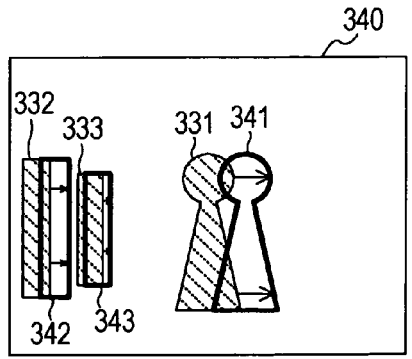

FIG. 8C schematically illustrates a case of moving the regions of the person 301 and posts 302 and 303 in accordance with the graph shown in FIG. 7. Note that in FIG. 8C, the regions 331 through 333 before moving are indicated by hatching, and regions 341 through 343 after moving are indicated by heavy lines. Arrows indicate the amount of movement of the regions. As shown in FIG. 8C, the amount of amount of motion of the subject (person 301) closest to the imaging apparatus 100 is relatively great. On the other hand, amount of motion of the subject (post 303) farthest from the imaging apparatus 100 is relatively small.

The following is a description of a specific method for calculating regions to be recorded. The image processing unit 130 calculates sections the lines in the imaged image to be handled, corresponding to regions to be recorded. Now, let us call a section in one line in the horizontal direction in the imaged image (right eye) 312 corresponding to a close-distance image (i.e., person 301), section O (expressed as [O1, O2]). The origin of the horizontal line in the imaged image (right eye) 312 is the left edge. Also, the section O is a closed interval wherein a depth value exceeding O continues. In this case, a section R1 which is a region to be recorded, on the one horizontal line on the imaged image to be handled, is detected using the following Expression 1. Now, the depth value of the close-distance subject in the section O will be called D1. Note that in the event that the depth value D1 is not uniform in the section O, the section R1 is calculated using the depth value which occurs the greatest number of times within the section O. Also, an arrangement may be made wherein the average value of each depth value in the section O is calculated, and the section R1 is calculated using the average value.

$$R1=O1, O2+k \cdot D1] \quad (1)$$

where k is a constant for identifying the amount of motion in the horizontal direction of the subject of interest, serving as a conversion offset coefficient k ($0 \leq k < 1$) for parallax, identified following the graph shown in FIG. 7.

These are calculated regarding the close-distance subject in each line in the imaged image (right eye) 312, and the calculated section R1 is the section to be recorded for each line. Also, in the event that multiple close-distance subjects exist within the same line, sections to be recorded are calculated for each of the close-distance subjects.

FIG. 8D illustrates regions to be recorded 351 through 353 extracted from the imaged image (right eye) 312 based on the sections to be recorded that have been calculated with Expression 1. In FIG. 8D, the outlines of the regions to be recorded 351 through 353 are indicated by solid lines, with the inside thereof hatched. Also, in FIG. 8D, only the position and size of the regions to be recorded 351 through 353 are indicated.

FIG. 8E illustrates the subjects included in regions to be recorded 361 through 363 in the imaged image (right eye) 312 within a rectangle 360, and also shows the outlines of the regions to be recorded 361 through 363 as heavy lines within the rectangle 360. Also, in the imaged image (right eye) 312, subjects included in regions other than the regions to be recorded 361 through 363 are illustrated with dotted lines within the rectangle 360. Note that the position and size of the regions to be recorded 361 through 363 in the imaged image (right eye) 312 are the same as the regions to be recorded 351 through 353 shown in FIG. 8D.

Figure 8F:
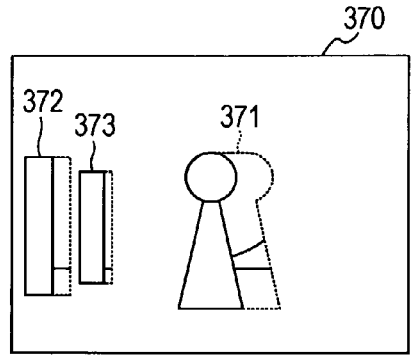

FIG. 8F illustrates a stereoscopic difference image 370 extracted from the imaged image (right eye) 312. The stereoscopic difference image 370 is an image corresponding to subjects included in regions to be recorded 371 through 373. Also, the background of the stereoscopic difference image 370 (regions other than the regions to be recorded 371 through 373) is of a solid color. Note that in FIG. 8F, the outlines of the regions to be recorded 371 through 373 are indicated by dotted lines. Also, the position and size of the regions to be recorded 371 through 373 in the stereoscopic difference image 370 are the same as with the regions to be recorded 361 through 363 shown in FIG. 8E.

Figure 9A:
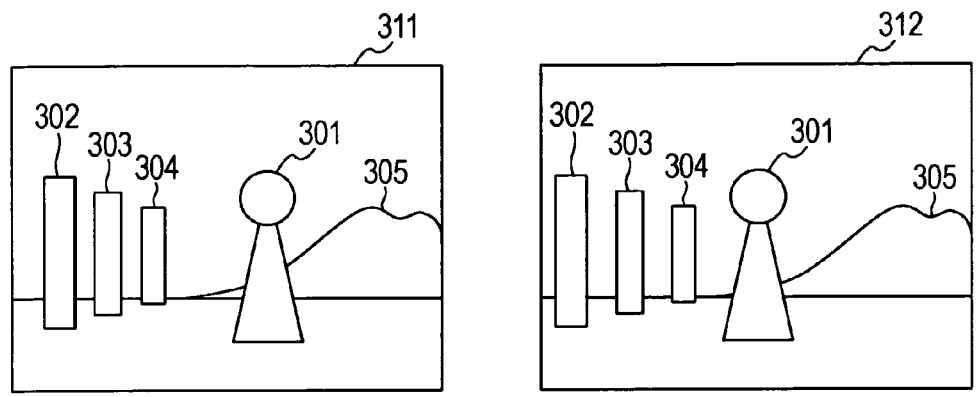
FIGS. 9A through 9C are diagrams schematically illustrating transition in a case of the image processing unit according to the first embodiment of the present invention generating a stereoscopic image from an imaged image (right eye)
Figure 9B:
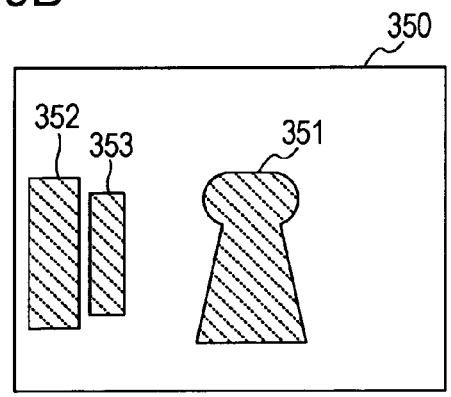
Figure 9C:
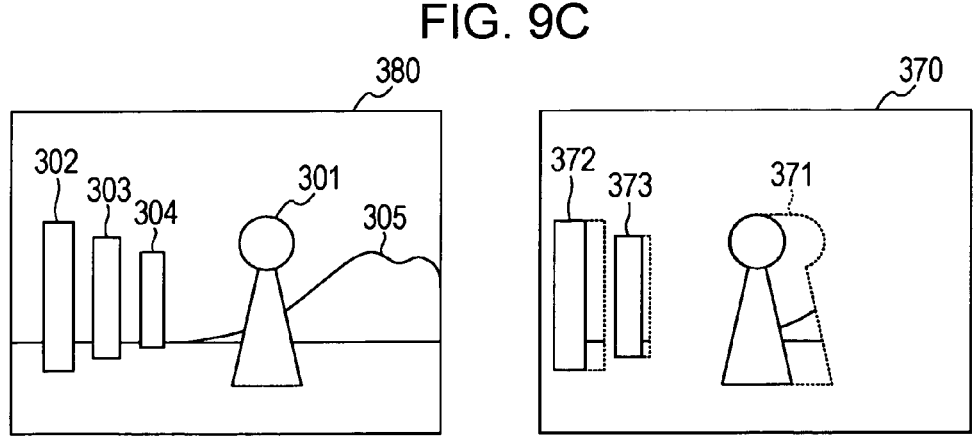

FIGS. 9A through 9C are diagrams schematically illustrating transition in a case of the image processing unit 130 according to the first embodiment of the present invention generating a stereoscopic difference image from the imaged image (right eye) 312. Note that the imaged image (left eye) 311 and imaged image (right eye) 312 shown in FIG. 9A are the same as those shown in FIG. 2C. Also, the regions to be recorded 351 through 353 shown in FIG. 9B are the same as those in FIG. 8D, and the stereoscopic difference image 370 shown in FIG. 9C is the same as that shown in FIG. 8F.

First, as shown in FIG. 9A, the imaging unit 110 generates the imaged image (left eye) 311 and the imaged image (right eye) 312. Next, the depth information generating unit 120 generates a depth map for each of the imaged image (left eye) 311 and imaged image (right eye) 312. Then, as shown in FIG. 9B, the image processing unit 130 calculates regions to be recorded 351 through 353 for the imaged image (right eye) 312, based on the depth map generated for the imaged image (right eye) 312. Following this, as shown in FIG. 9C, the image processing unit 130 generates a stereoscopic main image 380 and a stereoscopic difference image 370. Note that the stereoscopic main image 380 shown in FIG. 9C is the same as the imaged image (left eye) 311 shown in FIG. 9A. Also, in the stereoscopic difference image 370, regions other than the regions to be recorded 371 through 373 are made a solid color (e.g., a blue back). That is to say, the stereoscopic difference image 370 is made up of the images included in the regions to be recorded 371 through 373, and the solid color for the regions other than the regions to be recorded 371 through 373.

Thus, for the imaged image (right eye) 312, only images for a part of the subjects included in the imaged image (right eye) 312 are extracted, and the extracted images are recorded as a stereoscopic difference image. Accordingly, in the event of recording moving images to display a stereoscopic image, the amount of data to be recorded can be markedly reduced as compared to cases of recording both imaged images generated at the same point-in-time. Also, in the event of displaying a stereoscopic image using a moving image file recorded in this way, the original image can be restored from the stereoscopic difference image. Thus, in the event of restoring the original image from the stereoscopic difference image, restoration can be performed using images of the close-distance subjects and surrounding region included in the original image, and the background image of the stereoscopic main image. Accordingly, a stereoscopic image which is more visually appealing than one restored using images of the close-distance subjects included in the original image and the background image of the stereoscopic main image can be displayed. Now, the image restored in this way is generally the same as the original image, but there may be portions of the background which differ. However, a stereoscopic image is made in order to allow the user to view a three-dimensional image using optical illusions due to optical parallax, so even in the event that a part of the background is different, applying interpolation and averaging processing on the temporal axis and spatial axes should be able to minimize effects on the user.

While an example has been shown wherein, of the subjects included in the imaged image (right eye), the regions of the close-distance subjects and the surrounding regions thereof are extracted based on the subject distance, an arrangement may be made wherein, of the subjects included in the imaged image (right eye), particular objects (e.g., human faces) are detected for example, and the regions of the detected objects and the surrounding regions thereof are extracted and recorded as a stereoscopic difference image.

Example of Recording Stereoscopic Main Image, Stereoscopic Difference Image, and Depth Map Next, a recording method for recording the stereoscopic main image and stereoscopic difference image generated by the image processing unit 130, and the depth map generated by the depth information generating unit 120, will be described in detail with reference to the drawings.

Figure 10A:
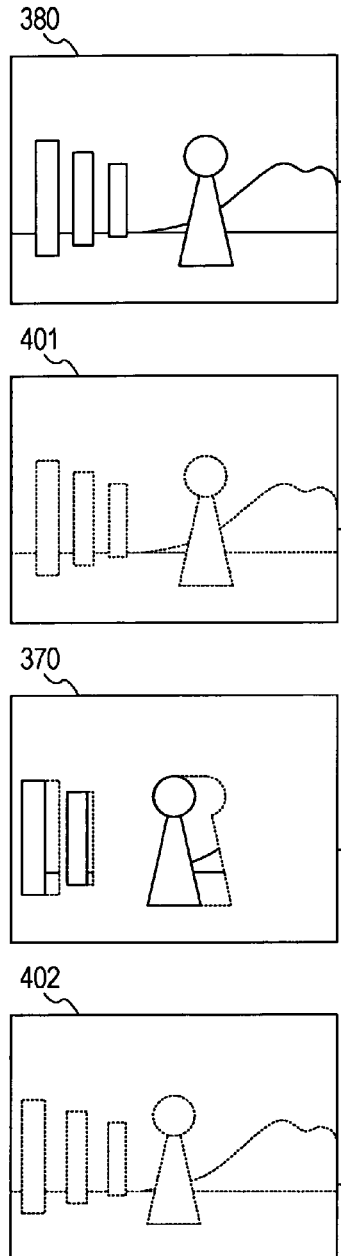
FIGS. 10A and 10B are diagrams schematically illustrating data processing in a case of a recording control unit according to the first embodiment of the present invention generating an AV stream.
Figure 10B:
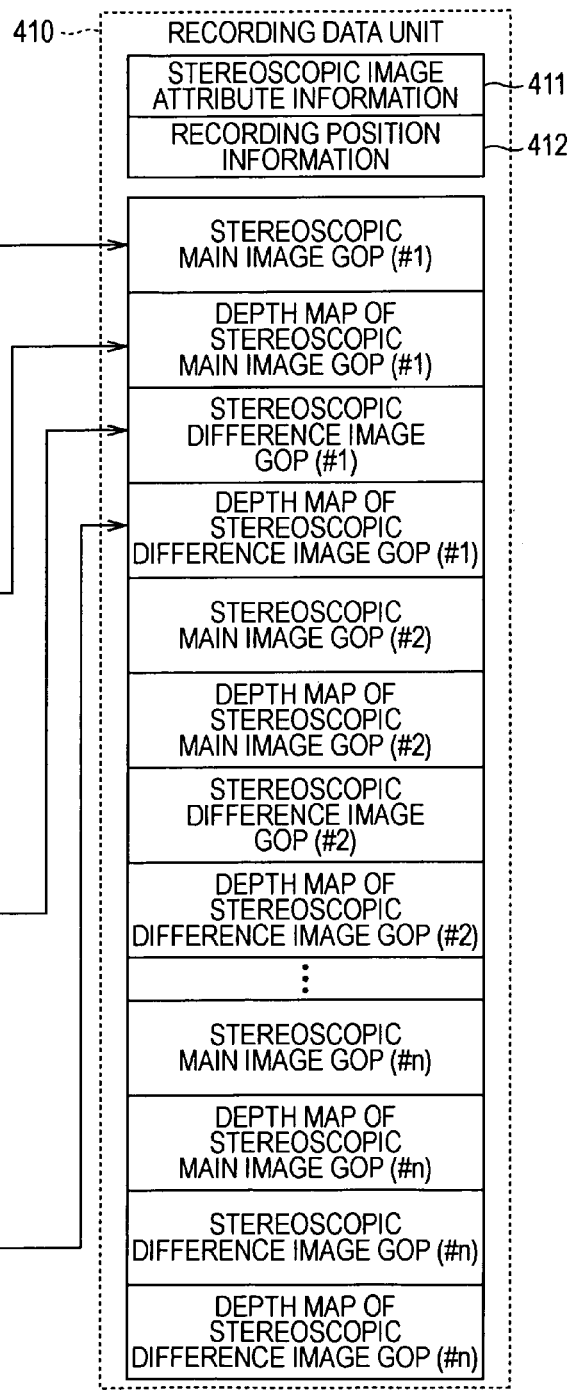

FIGS. 10A and 10B are diagrams schematically illustrating data processing in a case of the recording control unit 160 according to the first embodiment of the present invention generating an AV stream. In this example, an example will be described wherein a video stream corresponding to the stereoscopic main image, a data stream corresponding to the depth map thereof, a video stream corresponding to the stereoscopic difference image, and a data stream corresponding to the depth map thereof, are multiplexed and an AV stream is generated.

FIG. 10A schematically illustrates a stereoscopic main image 380 and stereoscopic difference image 370 generated by the image processing unit 130, and depth maps 401 and 402 generated by the depth information generating unit 120. Note that the stereoscopic main image 380 and stereoscopic difference image 370 shown in FIG. 10A are the same as the stereoscopic main image 380 and stereoscopic difference image 370 shown in FIG. 9C. Also, the depth map 401 is a depth map generated for the stereoscopic main image 380, and the depth map 402 is a depth map generated for the stereoscopic difference image 370. Note that the depth maps 401 and 402 indicate the subjects included in the corresponding images by dotted lines, and illustrating of specific depth values will be omitted in the drawings.

FIG. 10B schematically illustrates the way in which the stereoscopic main image 380 and stereoscopic difference image 370 generated by the image processing unit 130 and the depth maps 401 and 402 generated by the depth information generating unit 120 are held in a stream buffer.

For example, the image encoder 140 performs compression ending of the stereoscopic main image 380 to generate digital video data (video stream), and also performs compression ending of the stereoscopic difference image 370 to generate digital video data (video stream). Note that genlocked images are used as the stereoscopic main image and stereoscopic difference image. Also, the depth information encoder 150 performs compression ending of the depth map 401 to generate digital data (data stream), and also performs compression ending of the depth map 402 to generate digital data (data stream).

Next, the recording control unit 160 generates video object units, wherein the generated stream data are each stored in units of GOPs (Group of Picture), along with file system management information and IFO (InFOrmation) file data. IFO as used here is a simplified term for a management information file for a stream management database which manages accessing/recording/playing/editing of the video/audio stream contents, in accordance with the AVCHD application format according to the present embodiment. The recording control unit 160 then stores a recording data unit 410, in which one to several video object units have been collected, in the stream buffer. Upon a predetermined number of recording data units 410 having been stored, the recording data units 410 are recorded all together to the storage unit 200, and this control is repeatedly performed. Note that a video object unit (may be abbreviated to "VOBU") is a set of one or two GOPs, and is a basic access unit of access to the media with an SD (Standard Definition) video format for the disc. If the disc has HD (High Definition) video format, a VOBU is an entry point (EP) unit and is a set of one to several GOPs. With the stereoscopic image recording/playing with the HD video format according to the present embodiment, one GOP unit set at the same point-in-time in the stereoscopic image stream is handled as one entry point unit.

Now, stereoscopic image attribute information 411 making up the recording data unit 410 has recorded herein stereoscopic image generating information output from the image processing unit 130, and depth map generating information output from the depth information generating unit 120. Stereoscopic image identification information and depth map presence/absence information is recorded in the AV stream and moving image management file, based on these information. Also, recordable logical addressees obtained from the storage unit 200 are recorded as recoding position information on the media. The logical address positions of the media are recorded in "EP_map( )" 725 in "CPI( ) structure" 724 shown in FIG. 19. Note that the same PTS is used for the video stream corresponding to the stereoscopic main image and the video stream corresponding to the stereoscopic difference image generated synchronously therewith. Also, stored in GOPs corresponding to the stereoscopic main image are audio streams including are shooting audio recorded at the time of shooting the stereoscopic main image, narration, background music, and so forth.

Figures 11A, 11B:
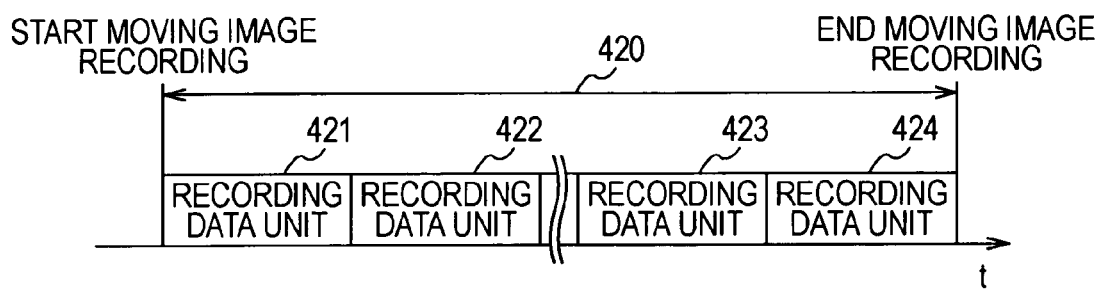
FIG. 11A is a diagram schematically illustrating a moving image file stored in a storage unit according to the first embodiment of the present invention.
FIG. 11B is a moving image management file for managing the moving image file.

Example of Recording to Moving Image File Relating to Stereoscopic Difference Image and Depth Map FIG. 11A is a diagram schematically illustrating a moving image file stored in the storage unit 200 according to the first embodiment of the present invention, and FIG. 11B is a moving image management file for managing the moving image file. FIG. 11B schematically illustrates recording data units 421 through 424 making up one moving image file. Now, the moving image file shown in FIG. 11A is a video data file wherein image data (video data) from starting of video image recording (starting shooting) to ending of video image recording (ending shooting) is one chapter 420. The recording data units 421 through 424 making up the moving image file correspond to the recording data unit 4100 shown in FIG. 10B, and are sequentially recorded in the storage unit 200 from the start of moving image recording to an operation instructing the end of moving image recording. Also, this moving image file includes image data and audio data.

FIG. 11B illustrates a moving image management file 430 stored in the storage unit 200. The moving image management file 430 is a file for managing the moving image file stored in the storage unit 200, and is an extended management file which handles editing of the moving image file. For example, recorded in the moving image management file 430 is playing list registration information 431 for managing the moving image file recorded between the moving image recording start operation to moving image recording end operation, in increments of individual chapters. This playing list registration information 431 is playing list registration information which is compatible with a moving image file for playing a flat image, with the playing start point and playing end point (i.e., IN/OUT points), editing attributes, and so forth, recorded therein.

The moving image management file 430 stores, as an extended application format, stereoscopy image identification information 432 and depth map presence/absence information 433. The stereoscopy image identification information 432 is information indicating whether or not the moving image file is a moving image file in which the stereoscopic main image and stereoscopic difference image are recorded in a correlated manner. Also, the depth map presence/absence information 433 is information indicating whether or not the moving image file is a moving image file in which a depth map is recorded for each image in a correlated manner.

For example, in the event that the moving image file is a moving image file in which the stereoscopic main image and stereoscopic difference image are recorded in a correlated manner, a "1" is recorded to the stereoscopy image identification information 432. On the other hand, in the event that the moving image file is a moving image file in which the stereoscopic main image and stereoscopic difference image are not recorded in a correlated manner (e.g., such as with a file dubbed from another recorder), a "0" is recorded to the stereoscopy image identification information 432. Recording the stereoscopy image identification information 432 in the moving image management file 430 in this way allows whether or not stereoscopic images can be displayed to be recognized, when playing the moving image file recorded in the storage unit 200, so playing can be performed appropriately.

Also, in the event that the moving image file is a moving image file in which a depth map is recorded for each image in a correlated manner, a "1" is recorded to the depth map presence/absence information 433. On the other hand, in the event that the moving image file is a moving image file in which a depth map is not recorded for each image in a correlated manner, a "0" is recorded to the depth map presence/absence information 433. Thus, recording the depth map presence/absence information 433 to the moving image management file 430 allows playing using the depth map to be performed appropriately when playing the moving image file recorded in the storage unit 200.

AVCHD Standard Data Structure Example

Next, the AVCHD Standard, which is an example of a moving image recording format, will be described in detail with reference to the drawings. FIG. 12 is a diagram schematically illustrating the types, roles, and relations of AVCHD files. With the AVCHD Standard, AV data (video/audio data) is handled with a hierarchical structure, and is roughly divided into index table, movie object, playlist, clip information like, and clip AV stream file.

The clip AV stream file (Clip AV Stream File) is a bit stream wherein video data and audio data has been multiplexed by the MPEG-2 TS (transport stream) format. Also, an OB stream (Overlay Bitmap stream) and MB stream (Menu Bitmap stream) can be multiplexed on the clip AV stream. Note that an OB stream is a graphics stream for displaying subtitles, and an MB stream is data used for menu display and the like (button image data and so forth) that has been streamed.

The clip information file (Clip Information File) is a file for holding information relating to the clip AV stream file as clip information. This clip information file includes a mapping (conversion) table for mapping between temporal position and spatial position (Address) in the clip AV stream file. Accordingly, an appropriate address in the clip AV stream file can be accessed by referring to the mapping table when an access point in the clip AV stream file has been specified by time.

The above clip AV stream files and corresponding clip information files in which are recorded clip information, will hereinafter be collectively referred to as "clips". Note that a clip AV stream file and clip information file making up a clip correspond in a one-on-one manner.

A playlist (PlayList) is configured of a clip to be played, and information relating to the start point and end point of the clip, and so forth. The playing start point and playing end point information is called a play item (PlayItem). Each playlist has one or more play items. Clip playing is performed by way of this playlist. That is to say, playing a playlist sequentially plays the play items included in the playlist. Accordingly, the corresponding sections in the clip are played following the playing start point and playing end point in the play item.

Each play item can be given a playlist mark. A playlist mark divides the play item into multiple chapters. Conversely, there may be multiple play items within a single chapter.

Playlists are generally divided into real playlists (Real PlayList) and virtual playlists (Virtual Playlist). A real playlist is a playlist wherein one or more clips are basically held in the order of recording, in units of clips. In a real playlist, there is no temporal skipping (gaps), and no overlapping with other real playlists. On the other hand, a virtual playlist is a playlist wherein part or all of one or more clips corresponding to a real playlist is optionally held.

A movie object (MovieObject) is an object including a navigation command program and so forth. Now, a navigation command program is a group of commands for controlling playing and processing following ending of playing of the playlist.

An index table is a highest-order table which defines the title of a content recorded in the recording medium. One movie or more is included in the index table, pointing from each movie title to the movie object. With a player, playing of contents is controlled based on the title information stored in the index table.

Figure 13:
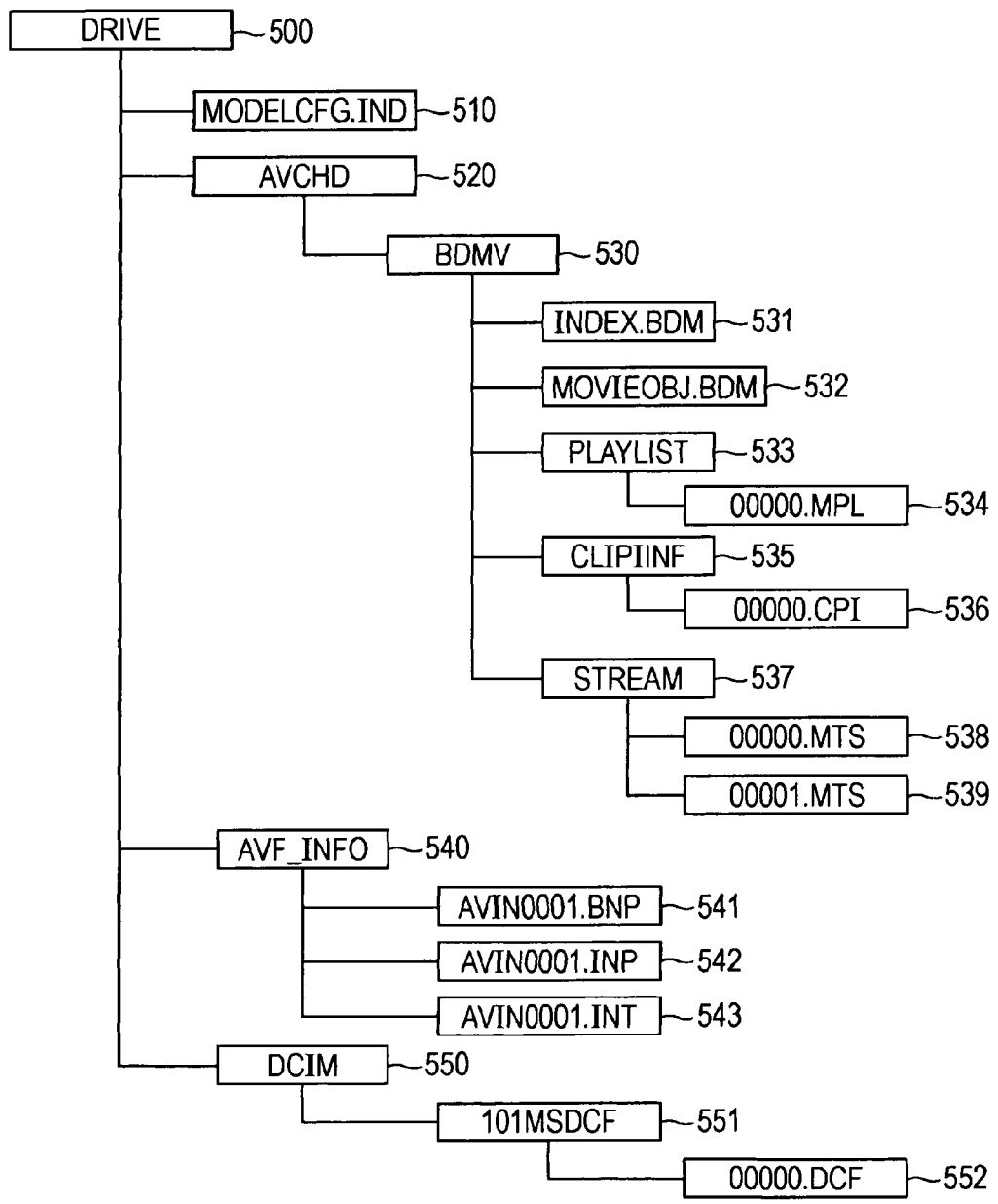
FIG. 13 is a diagram illustrating an example of file configuration under the AVCHD Standard.

FIG. 13 is a diagram illustrating an example of a file configuration under the AVCHD format. Under the root directory "drive" 500 of the recording medium are a file "MODELCFG.IND" 510, a directory "AVCHD" 520, a directory "AVF_INFO" 540, and a directory "DCIM" 550. Also, under the directory "AVCHD" 520 is a directory "BDMV" 530.

The file "MODELCFG.IND" 510 is a vendor unique definition file (an information file decided by the vendor). Also, the directory "BDMV" 530 is a directory to which folders and files stipulated by the moving image video recording application format.

Directly beneath the directory "BDMV" 530 are situated a file "INDEX.BDM" 531 and file "MOVIEOBJ.BDM" 532. Also, beneath the directory "BDMV" 530 are a directory "PlayList" 533, directory "CLIPINF" 535, and directory "STREAM" 537.

The file "INDEX.BDM" 531 is an index file for storing the content of the directory "BDMV" 530, and is a file for registering and managing moving image files (chapters). Also, the file "MOVIEOBJ.BDM" 532 is a file decided by the application recording format, and stores information of movie objects.

The directory "PlayList" 533 is a directory where a database for a playlist is situated. The "PlayList" 533 includes files relating to the playlist (e.g., file "00000.MPL" 534). The file names of files in the directory "PlayList" 533 are made up of a five-digit number and a suffix. Of five-digit numbers, the one thousand numbers "00000" through "00999" are for real playlists, and the one thousand numbers "01000" through "01999" are for virtual playlists. The suffix is ".MPL". Files in the directory "PlayList" 533 are units in which access to each moving image file (chapter) is registered for each content, and the start point (IN point) and end point (OUT point) are managed by logical point-in-time specification.

The directory "CLIPINF" 535 is a directory where a database of clips is held. The directory "CLIPINF" 535 includes clip information files corresponding to each of the clip AV stream files, for example (e.g., file "00000.CPI" 536). The file names of files in the directory "CLIPINF" 535 are made up of a five-digit number and a suffix. The suffix is ".CPI". Files under the directory "CLIPINF" 535 are files for managing access to the AV stream corresponding to the moving image file (chapter).

The directory "STREAM" 537 is a directly where AV stream files, which are actual entities, are held. The directory "STREAM" 537 includes, for example, clip AV stream files corresponding to each clip information file (e.g., files "00000.MTS" 538 and 539). Also, the files under the directory "STREAM" 537 are made up of MPEG-2 transport streams, and the file names are made up of a five-digit number and a suffix. Now, the portion of the five-digit number in the file name is the same is that of the corresponding clip information file, thereby representing the correlation between the clip information file and this clip AV stream file. Also, the suffix for each file is ".MTS". Further, for the files under the directory "STREAM" 537, there is one file per chapter. Moreover, for example, within each recording data unit within a chapter, a stereoscopic main image and the depth map thereof, and a stereoscopic difference image and the depth map thereof, are recorded are alternately recorded at the EP (ENTRY POINT). Also, stereoscopic image identification information and depth map presence/absence information are recorded in a modified digital video pack (also abbreviated to "MDP") of an elementary stream (ES) stream, i.e., an ES stream. Note that an EP is made up of one or multiple GOPs, and is the basic access unit to the media with the recording format under the AVCHD Standard.

The directory "AVF_INFO" 540 is a directory to which belong files of an application format managing classification group registration information and preference information, to aid the user in operations. Also, under the directory "AVF_INFO" 540 are, for example, a file "AVIN0001.BNP" 541, a file "AVIN0001.INP" 542, and a file "AVIN0001.INT" 543.

The file "AVIN0001.BNP" 541 is a UI (USER INTERFACE) management information file of the AV stream file, and is a backup file of file "AVIN****.INP". The file "AVIN0001.INP" 542 is a UI management information file of the AV stream file, and is an attribute registration file for each file recorded. The file "AVIN0001.INT" 543 is a UI management information file of the AV stream file, and is a file for registering thumbnail images to display each file recorded as stereoscopic images. Note that thumbnail images will be described in detail with reference to FIGS. 29A through 30C.

The directory "DCIM" 550 is a directory to which folders stipulated by the sill image recording application format, and still image files, belong. Also, directly beneath the directory "DCIM" 550 is a DCF (DESIGN RULE FOR CAMERA FILE SYSTEM) directory (e.g., directory "101MSDCF" 551). Beneath the DCF directory is an image file (e.g., file "00000.DCF" 552).

Figure 14:
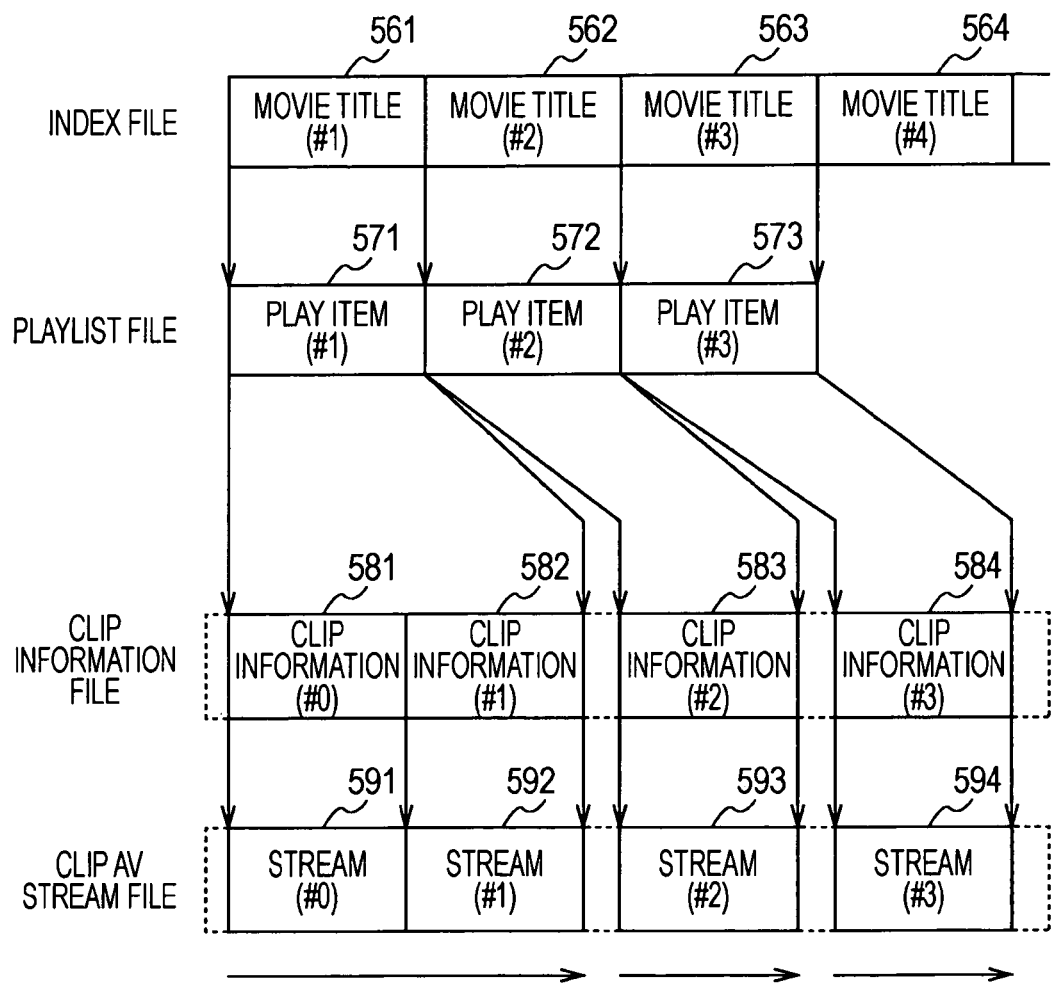
FIG. 14 is a diagram illustrating data structure under the AVCHD Standard.

FIG. 14 is a diagram illustrating the data structure under the AVCHD Standard. In the example shown in FIG. 14, clip information (#0) 581 holds information relating to stream (#0) 591, and clip information (#1) 582 holds information relating to stream (#1) 592. Also, clip information (#2) 583 holds information relating to stream (#2) 593, and clip information (#3) 584 holds information relating to stream (#3) 594. Note that in this example, play items (#1) 571 through (#3) 573 belong to a real playlist.

The index table is the highest-order level table defining titles of the contents recorded in the recording medium. One or more movie titles is included in this index table, so as to point to play items from each of the movie titles. In this example, the movie title (#1) 561 points to play item (#1) 571, the movie title (#2) 562 points to play item (#2) 572, and the movie title (#3) 563 points to play item (#3) 573. Playing of the contents is controlled at the player based on the title information stored in the index table.

Example of Recording with the AVCHD Standard

Next, a recording example of recording stereoscopic image identification information for identifying stereoscopic images generated by the image processing unit 130 according to the AVCHD Standard will be described in detail with reference to the drawings. First, a case of recording stereoscopic image identification information and depth map presence/absence information in the AV stream according to the AVCHD Standard will be described.

Example of Recording to AV Stream

FIGS. 15A through 15C are diagrams illustrating the data structure of an MDP (Modified DV Pack) in general under the AVCHD Standard. FIG. 15A schematically illustrates an elementary stream (ES). Note that in FIG. 15A, of the elements making up the ES, the rectangles representing MDPs will be denoted by "MDP", and notation of other elements will be omitted. As shown in FIG. 15A, MDP is recorded as user data in an EP made up of one to several GOP units. With the first embodiment according to the present invention, the ES stream is recorded as a moving image file with 1 GOP (e.g., 0.5 seconds) as an EP interval.

FIG. 15B schematically illustrates stereoscopic image identification information. This stereoscopic image identification information is an identification flag for identifying whether or not the stream is compatible with stereoscopy, i.e., whether or not the stream includes a stereoscopic main image and stereoscopic difference image. The 1 bit in the MDP defining this identification flag is set to "TRUE" in the event that the stream is compatible with stereoscopy, and is set to "FALSE" in the event that the stream is not compatible with stereoscopy. Also, the depth map presence/absence information is an identification flag identifying whether or not depth maps have been recorded for the stereoscopic main image and stereoscopic difference image corresponding to the stream. The 1 bit in the MDP defining this identification flag is set to "TRUE" in the event that depth maps have been recorded, and is set to "FALSE" in the event that depth maps have not been recorded. Note that in the event that the stream corresponding to the depth map presence/absence information is a stream including stereoscopic main images and stereoscopic difference images, the identification flag relating to the depth maps of the stereoscopic main image and stereoscopic difference image is recorded. On the other hand, in the event that the stream corresponding to the depth map presence/absence information is not a stream including stereoscopic images, the identification flag relating to the depth map corresponding image is recorded.

FIG. 15C illustrates a partial syntax of the overall data structure of the MDP. The block "ModifiedDVPackMeta( )" in the "MDP basic stricture" 601 is a block for storing appended information regarding the MDP. Each one_modified_dv_pack pack (5 bytes) in the "ModifiedDVPackMeta( ) structure" 602 stores data such as the shooting point-in-time, shooting video information, GPS position information, and so forth, up to the predetermined pack ID No. That is to say, "mdp_data" of "individual one_modified_dv_pack #k structures" stores data such as the shooting point-in-time, shooting video information, GPS position information, and so forth, up to the predetermined pack ID No. For example, MakerOption #1 is used for version description, release specifications description, and recording image quality mode description. Also, MakerOption #2 is used for makerPrivateData.

Next, an example of recording the stereoscopic image identification information and depth map presence/absence information shown in FIG. 15B using follow-up addition of MakerOption according to the first embodiment of the present invention will be described. That is, "mdp_data" in "MakerOption #k structure" 604 stores the stereoscopic image identification information and depth map presence/absence information shown in FIG. 15B.

Note that an arrangement may be made with definition in the format specifications to use the region used for PADDINGID of "ModifiedDVPackMeta" to record the stereoscopic image identification information and depth map presence/absence information for each EP.

Recording the stereoscopic image identification information and depth map presence/absence information in the MDP in this way allows the control system to read these out and recognize whether or not the stream is compatible with stereoscopy, and whether or not there are depth maps. The streams can be read out and the read streams decoded and displayed based on the results of the recognition.

Figure 16:
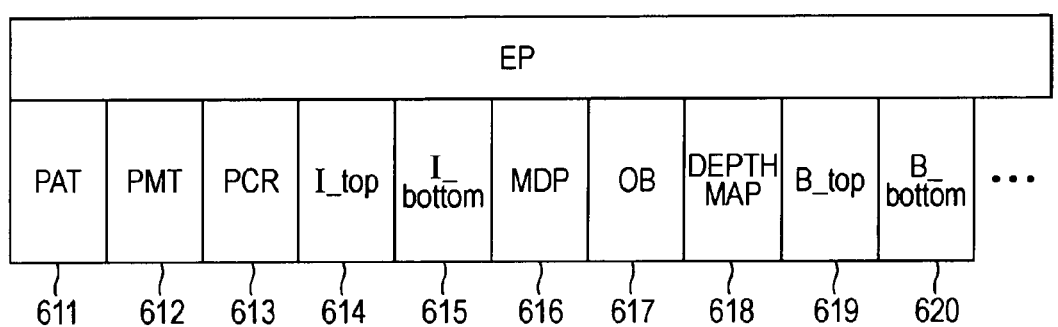
FIG. 16 is a diagram illustrating the configuration of a stream file including a data stream compatible with a depth map under the AVCHD Standard.

FIG. 16 is a diagram illustrating of a stream file including a data stream compatible with depth maps in the AVCHD Standard. In this example, a configuration example within the EP of a data stream compatible with stereoscopy is illustrated. Note that the stream file is handled as a transport stream (also referred to as "TS stream" configured of multiple transport packets at the time of transmission. At the time of recording, the stream file is converted in to a stream in units of PES (Packetized Elementary Stream) packets.

A PAT (Program Association Table) 611 is program information (section) for describing the number of programs in the stream, and the PID of the PMT (Program Map Table) of each program. Note that a PID (Packet Indentifier) is identifier information indicating the type of data which the TS (Transport Stream) packet is transmitting, and is stored in the header thereof. Note that with the AVCHD Standard, the PID of a PAT is "0X0000" (where 0x means the subsequent numerals are hexadecimal, this holds true in the following description as well).

The PMT 612 is a section describing the PID of the video/audio stream included in the corresponding program, and the PID of the PCR (Program Clock Reference). Note that in the AVCHD Standard, the PID of the PMT is "0X0001".

The PCR 613 is the input point-in-time to the T-STD (Transport-System Target Decoder) described in the TS packet storing the PID of the PCR, and is stored in the stream at increments of 0.1 seconds or shorter. Note that in the AVCHD Standard, the PID of the PCR is "0X1001".

Note that PTS (Presentation Time Stamp) is a display point-in-time time stamp, and is described in the header of the PES (Packetized Elementary Stream). DTS (Decoding Time Stamp) is a decoding point-in-time time stamp, and is described in the header of the PES.

Also, I_top 614 is a PES corresponding to the top field of an I picture, and I_bottom 615 is a PES corresponding to the bottom field of an I picture. MDP 616 is a PES corresponding to the MDP, and OB 617 is a PES corresponding to the OB stream. B_top 619 is a PES corresponding to the top field of a B picture, and B_bottom 620 is a PES corresponding to the bottom field of a B picture. The depth map 618 is a PES corresponding to the depth map.

In the AVCHD Standard, the PID of a video stream is "0X10". For example, the PID of the PCR is "0X1001". Also, with the AVCHD Standard, the PID of an audio stream is "0X11". Further, with the AVCHD Standard, the PID of an OB (OverlayBitmap) is "0X12". Moreover, with the AVCHD Standard, the PID of menu data (MenuData) is "0X14".

Accordingly, for the PID of a data stream corresponding to the depth map, an undefined PID can be newly defined in the PID "0X10" of the video stream, for example. Also, for example, the undefined PID "0X1*" can be newly defined and used. Thus, the data streams corresponding to the depth map can be suitably separated by PID selectors or the like, and the depth map can be used when playing.

Example of Recording to Index File

Next, a case of recording the stereoscopic image identification information and depth map presence/absence information to file management information under the AVCHD Standard will be described in detail with reference to the drawings. First, a case will be described of recording the stereoscopic image identification information and depth map presence/absence information in an index file under the AVCHD Standard. Note that the stereoscopic image identification information and depth map presence/absence information described below may be the same as that shown in FIG. 15B, for example.

Figure 17:
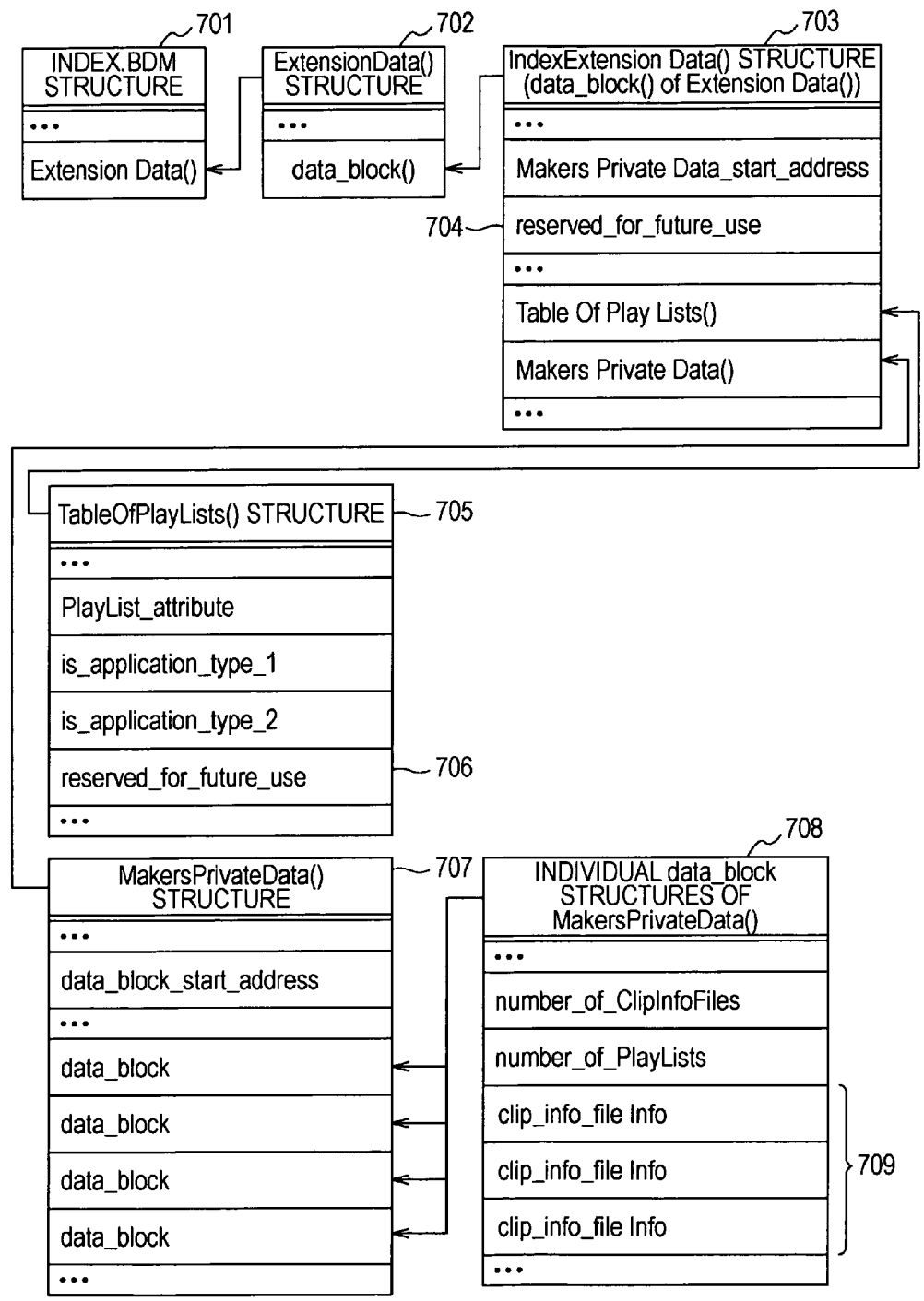
FIG. 17 is a diagram illustrating the data structure of an index file under the AVCHD Standard.

FIG. 17 is a diagram illustrating the data structure of an index file under the AVCHD Standard. The block "Extension Data( )" in the "INDEX.BDM structure" 701 is a block (extended data block) for storing predetermined extended data. The block "Data Block( )" in the "Extension Data( ) structure" 702 is a block where the main entity of the extended data is stored. The region "reserved_for_future_use" 704 in the "Index Extension Data( ) structure" 703 is a region reserved for byte alignment, addition of future fields, and so forth. This holds the same for all occurrences of "reserved_for_future_use" hereinafter. For example, the stereoscopic image identification information and depth map presence/absence information can be recorded in the "reserved_for_future_use" 704. Two bits of the region "reserved_for_future_use" 704 can be appropriated for recording the stereoscopic image identification information and depth map presence/absence information.

Also, the block "TableOfPlayLists( )" in the "INDEX Extension Data( ) structure" 703 is a block where playlist attribute information is stored. For example, the stereoscopic image identification information and depth map presence/absence information can be recorded in the "reserved_for_future_use" 706 in the "TableOfPlayLists( ) structure" 705, as playlist file attribute information. Two bits of the region "reserved_for_future_use" 706 can be appropriated for recording the stereoscopic image identification information and depth map presence/absence information.

Also, the block "MakersPrivateData( )" in the "INDEX Extension Data( ) structure" 703 is a block where AV streams (contents) are managed. The region "clip_info_file Info" 709 in each data_block structure" 708 of the "MakersPrivateData( )" is entry information of the clip information file for accessing into the AV stream. For example, the stereoscopic image identification information and depth map presence/absence information can be recorded in an unused reserved region in the region "CLIP_INFO_FILE INFO" 709. Two bits of the region "clip_info_file Info" 709 can be appropriated for recording the stereoscopic image identification information and depth map presence/absence information. Thus, in the event of recording the flags, in the event that an AV stream relating to stereoscopic images is recorded corresponding flags are registered, and in the event that the AV stream is edited, the corresponding flags are updated.

Thus, with the first embodiment, two bits are newly defined for flags in a region where "reserved_for_future_use" is defined for example, and the stereoscopic image identification information and depth map presence/absence information are stored.

Example of Recording to a Playlist File

Next, a case of recording the stereoscopic image identification information and depth map presence/absence information to a playlist file under the AVCHD Standard will be described.

Figure 18:
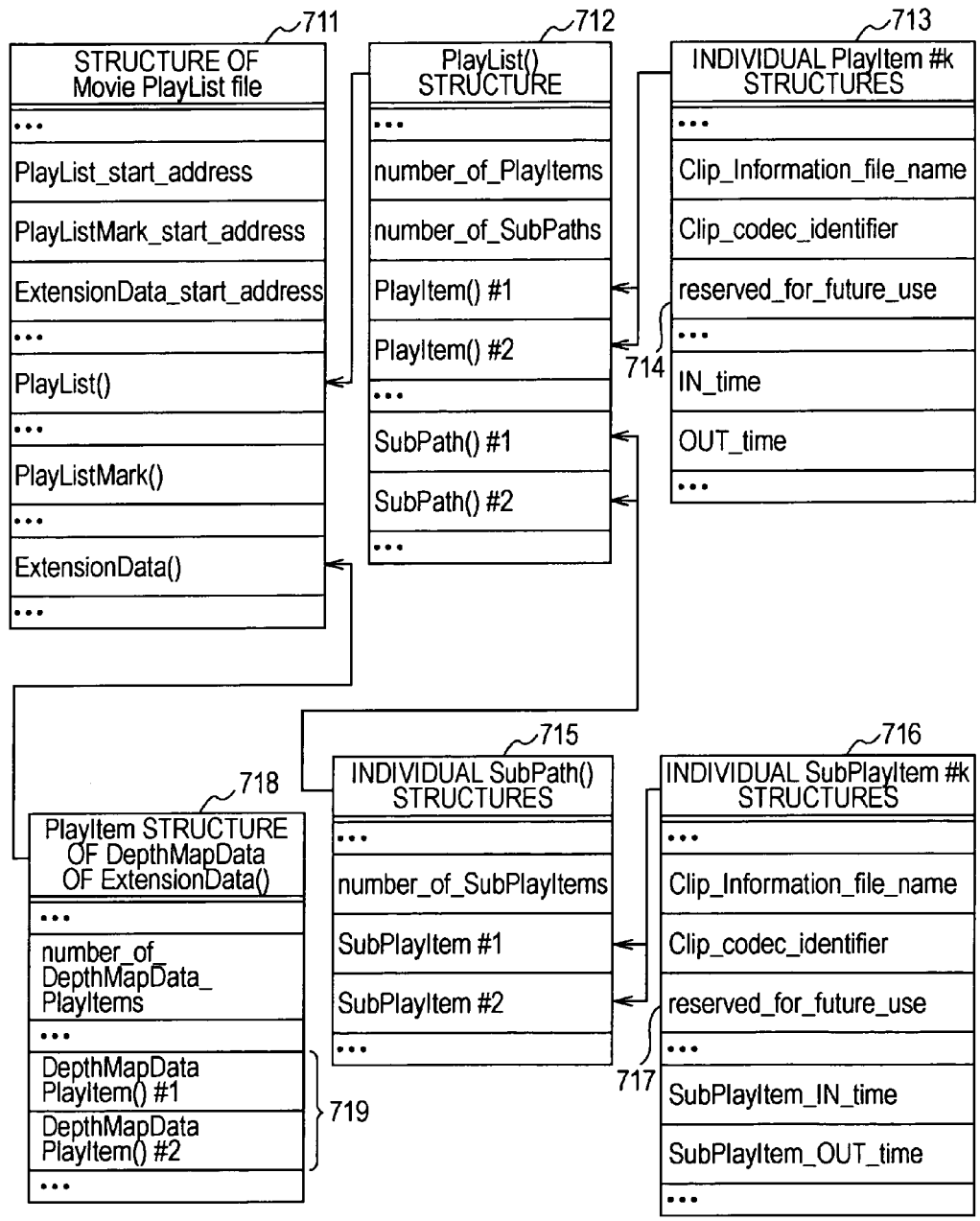
FIG. 18 is a diagram illustrating the data structure of a playlist file under the AVCHD Standard.

FIG. 18 is a diagram illustrating the data structure of a playlist file under the AVCHD Standard. The block "PlayList( )" in the "Structure of Movie PlayList file" 711 is a block where a playlist is described. The block "ExtensionData( )" is a block for storing predetermined extension data.

The "PlayItem( ) #1" and "PlayItem( ) #2" in the "PlayList( ) structure" 712 are blocks where play item attribute information is stored. For example, the stereoscopic image identification information and depth map presence/absence information can be stored in the region "reserve_for_future_use" 714 of the "individual PlayItem #k structures" 713. Two bits of the region "reserved_for_future_use" 714 can be appropriated for recording the stereoscopic image identification information and depth map presence/absence information, for example.

Now, in comparison with the main path corresponding to play items which are mainly played, a sub-path can be set for sub-play items. "SubPath( ) #1" and "SubPath( ) #2" in the "PlayList( ) structure" 712 are blocks where sub-path attribute information corresponding to sub-play items is stored. In the case of corresponding to a sub-path, the stereoscopic image identification information and depth map presence/absence information can be recorded to the corresponding position. Two bits of the region "reserved_for_future_use" 717 in the "individual SubPlayItem #k structures" 716 can be appropriated for recording the stereoscopic image identification information and depth map presence/absence information, for example.

Also, the block "ExtensionData( )" in the "Structure of Movie PlayList file" 711 can be used for storing extension data in the playlist file. Now, let us consider a case of performing dubbing by authoring, with regard to video data (VideoData), audio data (AudioData), OB (OverlayBitmapData), and menu data (MenuData). The registration positions in the AVCHD Standard are defined after each data is dubbed by authoring. However, the registration position for registration of depth map data to play items has not yet been defined with the AVCHD Standard. Accordingly, with the first embodiment according to the present invention, a registration region for registration of depth map data to play items is newly defined in the block "ExtensionData( )", and registration of depth map data to play items is performed. For example, registration of depth map data for play items is performed to "DepthMapDataPlayItem( ) #1, #2" 719 of the "PlayItem structure of DepthMapData of ExtensionData( )" 718.

Example of Recording to Clip Information File

Figure 19:
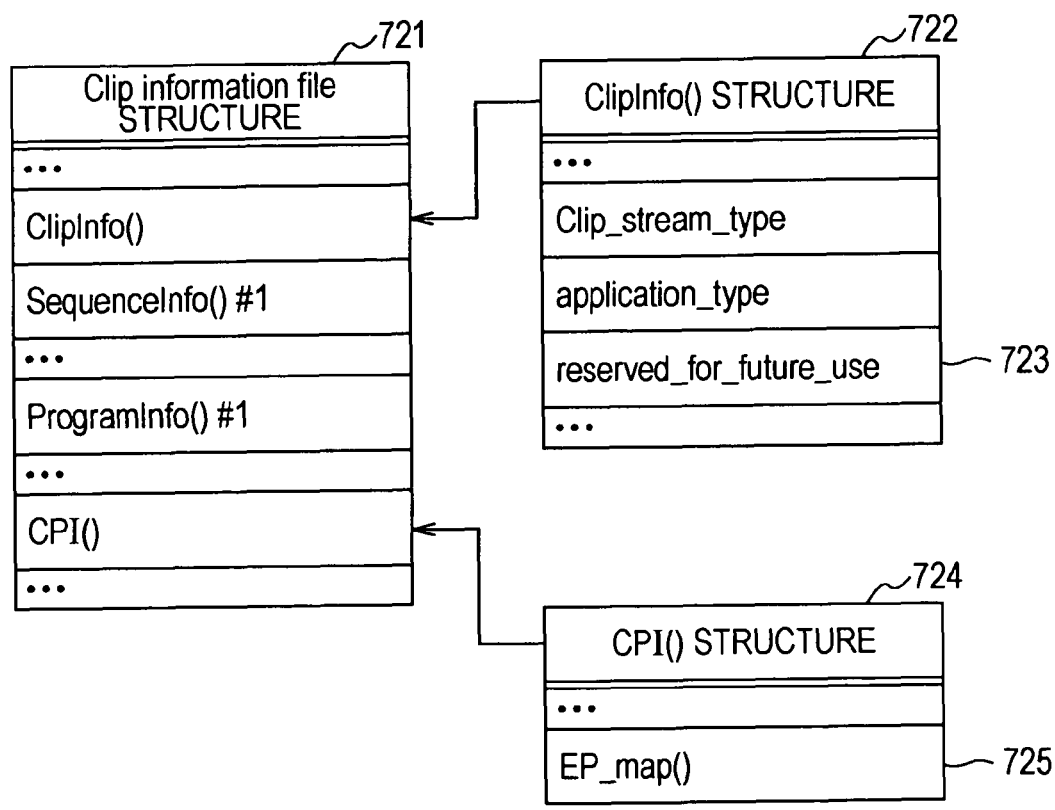
FIG. 19 is a diagram illustrating the data structure of a clip information file under the AVCHD Standard.

Next, a case of recording the stereoscopic image identification information and depth map presence/absence information to a clip information file under the AVCHD Standard will be described. FIG. 19 is a diagram illustrating the data structure of a clip information file under the AVCHD Standard.

The block "ClipInfo( )" in "Clip Information File structure" 721 is for describing information relating to the clip AV stream managed by the clip information file. For example, the stereoscopic image identification information and depth map presence/absence information can be stored in the region "reserved_for_future_use" 723 of the "ClipInfo( ) structure" 722. Two bits of the region "reserved_for_future_use" 723 can be appropriated for recording the stereoscopic image identification information and depth map presence/absence information, for example.

Now, "ClipInfo( )" in "Clip Information File structure" 721 stores information relating to a mapping table for mapping between the temporal position and spatial position for the entire stream file. For example, at the time of the AV stream being recorded, the attribute information of all EPs of each AV stream is registered in the corresponding files corresponding to the AV streams. Also, in the event that an AV stream is edited, the attribute information of all EPs of each AV stream is updated in the corresponding files corresponding to the AV streams. This registered or edited information is used for accessing at the time of playing.

The "EP_map( )" 725 in the "CPI( ) structure" 724 is a correlation table for the logical address position on the media for EPs (Entry Point), and point-in-time time stamps for content streams. For example, the maximum number of EPs in the "EP_map( )" 725 is around 180,000. In this case, in the event of recording each EP as 0.5 seconds (1 GOP), the maximum amount of time per chapter is around 90,000 seconds (25 hours).

Note that the stereoscopic image identification information and depth map presence/absence information may be written to each of the MDP, index file, clip information file, and movie playlist file, or just to one. Thus, with the first embodiment of the present information, the stereoscopic image identification information and depth map presence/absence information can be recorded to and used from multiple hierarchical levels.

Example of Recording to Moving Image Files with AVCHD

Figure 20:
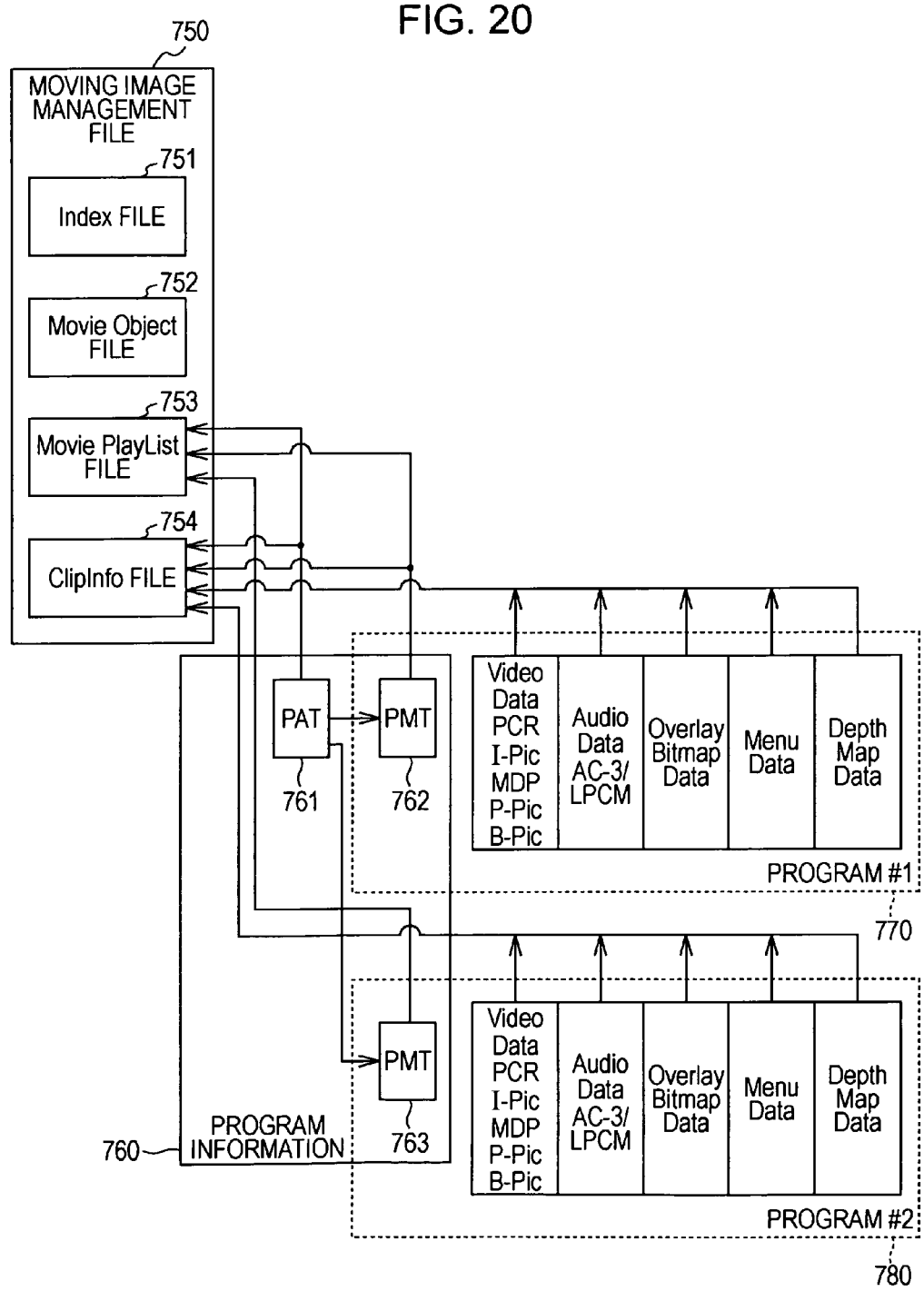
FIG. 20 is a diagram schematically illustrating a case of each of multiple sets of data relating to a stereoscopic image being recorded in respective management files by a recording control unit according to the first embodiment of the present invention.

FIG. 20 is a diagram schematically illustrating a case of each of multiple sets of data relating to a stereoscopic image being recorded in respective management files by the recording control unit 160 according to the first embodiment of the present invention. This example schematically illustrates registration of map data shown in FIG. 18 to a play item, and registration to the EP_map shown in FIG. 19. Note that the Index file 751, the MovieObject file 752, the MoviePlayList file 753, and the ClipInfo file 754 are the same as described above, so description thereof will be omitted here. Also, in this example, the program #1 (770) is a stream corresponding to the stereoscopic main image, and the program #2 (780) is a stream corresponding to the stereoscopic difference image. A list of the program #1 (770) and program #2 (780) is described in the PAT 761. Further, information of the program #1 (770) is stored in the PMT 762, and information of the program #2 (780) is stored in the PMT 763.

The program #1 (770) and program #2 (780) include video data (VideoData) and audio data (AudioData), as well as OB (OverlayBitMapData), menu data (MenuData), and depth map data (Depth Map Data).

As shown in FIG. 18, a registration region for the depth data for the play item is defined in the block "ExtensionData( )" in the "Structure of Movie PlayList file" 711, and registration is performed of the depth data for the play item. That is to say, registration is performed for the depth data for the play item in the MoviePlayList file 753 based on the information of PAT 761, PMT 762, and PMT 763.

Also, as shown in FIG. 19, attribute information for all EPs of each stream is registered in the block "CPI( )" in the "Clip Information File structure" 721. That is to say, registration of each filed in the ClipInfo file 754 is performed based on the data included in the PAT 761, PMT 762, PMT 763, program #1 (770), and program #2 (780). As described above, stereoscopic image identification information and depth map presence/absence information are recorded in each file in the moving image management file 750, but illustration in the drawings and description thereof are omitted here.

Example of Operation of Imaging Apparatus

Figure 21:
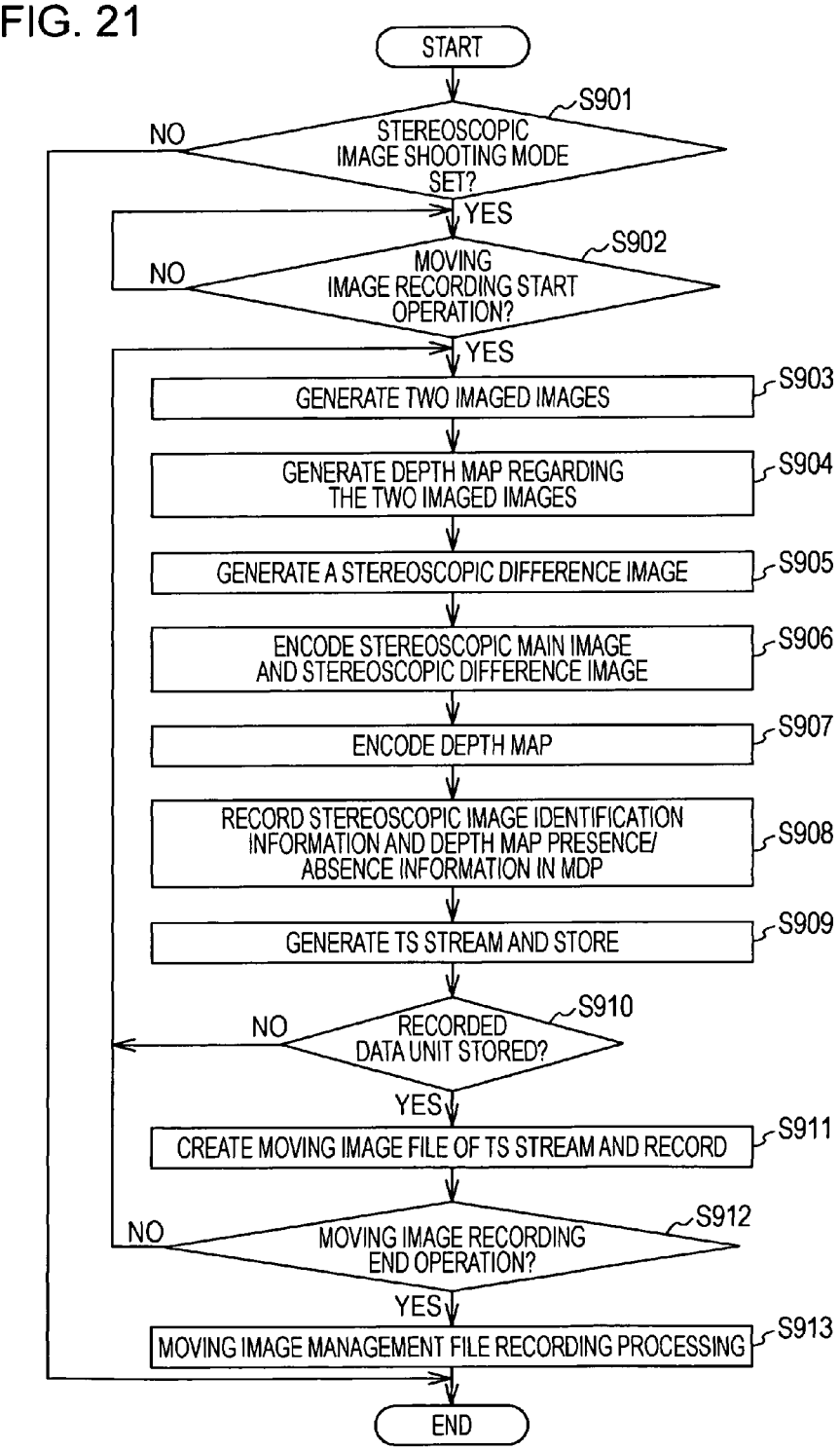
FIG. 21 is a flowchart illustrating processing procedures of moving image recording processing performed by the imaging device according to the first embodiment of the present invention.

FIG. 21 is a flowchart illustrating processing procedures for moving image recording processing with the imaging apparatus 100 according to the first embodiment of the present invention. In this example, description will be made regarding moving image recording processing wherein a moving image file in which a stereoscopic main image and stereoscopic difference image have been correlated, and a moving image management file for managing the moving image file, are recorded.

First, determination is made regarding whether or not a stereoscopic image imaging mode, for recording a moving image in which a stereoscopic main image and stereoscopic difference image have been correlated, has been set (step S901). In the event that determination is made in step S901 that the stereoscopic image imaging mode has not been set, the moving image recording processing ends.

On the other hand, in the event that determination is made in step S901 that the stereoscopic image imaging mode has been set, determination is made regarding whether or not an operation for starting moving image recording has been performed (step S902). For example, determination is made in a state in which the stereoscopic image imaging mode has been set, regarding whether or not a pressing operation for pressing a recording button has been performed.

In the event that determination is made in step S902 that an operation for starting moving image recording has not been performed, monitoring is continued until an operation for starting moving image recording is accepted. On the other hand, in the event that determination is made in step S902 that an operation for starting moving image recording has been performed, the imaging unit 110 generates two imaged images (imaged image (right eye) and imaged image (left eye)) (step S903). Note that step S903 is an example of the imaging described in the Summary of the Invention.

Next, the depth information generating unit 120 generates depth maps for the two imaged images (step S904). Note that step S904 is an example of depth information generating described in the Summary of the Invention.

Next, the image processing unit 130 generates, for one of the two imaged images that have been generated (e.g., the imaged image (right eye)), a stereoscopic difference image using a depth map generated for the imaged image (step S905). Note that step S905 is an example of the image processing described in the Summary of the Invention.

Next, the image encoder 140 encodes the generated stereoscopic difference image and stereoscopic main image (e.g., imaged image (left eye)) (step S906).

Next, the depth information encoder 150 encodes the two generated depth maps (e.g., depth maps relating to the imaged image (right eye) and imaged image (left eye)) (step S907).

Next, the recording control unit 160 records the stereoscopic image identification information and depth map presence/absence information in the MDP, based on the depth map generation information output from the depth information generating unit 120, and the stereoscopic image generation information output from the image processing unit 130 (step S908).

Next, the recording control unit 160 multiplexes the streams to generate a TS stream, and stores the generated TS steam in the stream buffer (step S909). For example, TS stream is generated by multiplexing a video stream in which stereoscopic main images and stereoscopic difference images are encoded, an MDP storing stereoscopic image identification information and depth map presence/absence information, and a data stream in which two depth maps are encoded.

Next, determination is made regarding whether or not a predetermined amount or greater of data has been stored in the stream buffer (step S910). In the event that determination is made in step S910 that a predetermined amount or greater of data has been stored in the stream buffer, the recording control unit 160 records the TS stream stored in the stream buffer in the storage unit 200 as a moving image file (step S911). On the other hand, in the event that determination is made in step S910 that a predetermined amount or greater of data has not been stored in the stream buffer, the flow returns to step S903. Note that steps S909 through S911 are an example of the recording control processing described in the Summary of the Invention.

Next, determination is made regarding whether or not a moving image recording end operation has been performed (step S912). For example, determination is made in a state in which moving image recording is being performed in the stereoscopic image imaging mode, regarding whether or not a pressing operation for pressing the recording button (operation for pressing the recording button again) has been performed. In the event that determination is made in step S912 that a moving image recording end operation has not been performed, the flow returns to step S903.

On the other hand, in the event that determination is made in step S912 that a moving image recording end operation has been performed, moving image management file recording processing is performed (step S913). For example, the recording control unit 160 records the stereoscopic image identification information and depth map presence/absence information in the index file, movie playlist file, and clip information file. The recording control unit 160 then causes the storage unit 200 to record each of the files in which the stereoscopic image identification information and depth map presence/absence information have been recorded. Upon the moving image management file recording processing ending, the moving image recording processing operations end.

Example of Stereoscopic Image Display

Next, an example of playing a moving image file recorded with stereoscopic main images and stereoscopic difference images correlated will be described in detail, with reference to the drawings.

Example of Playing Device

Figure 22:
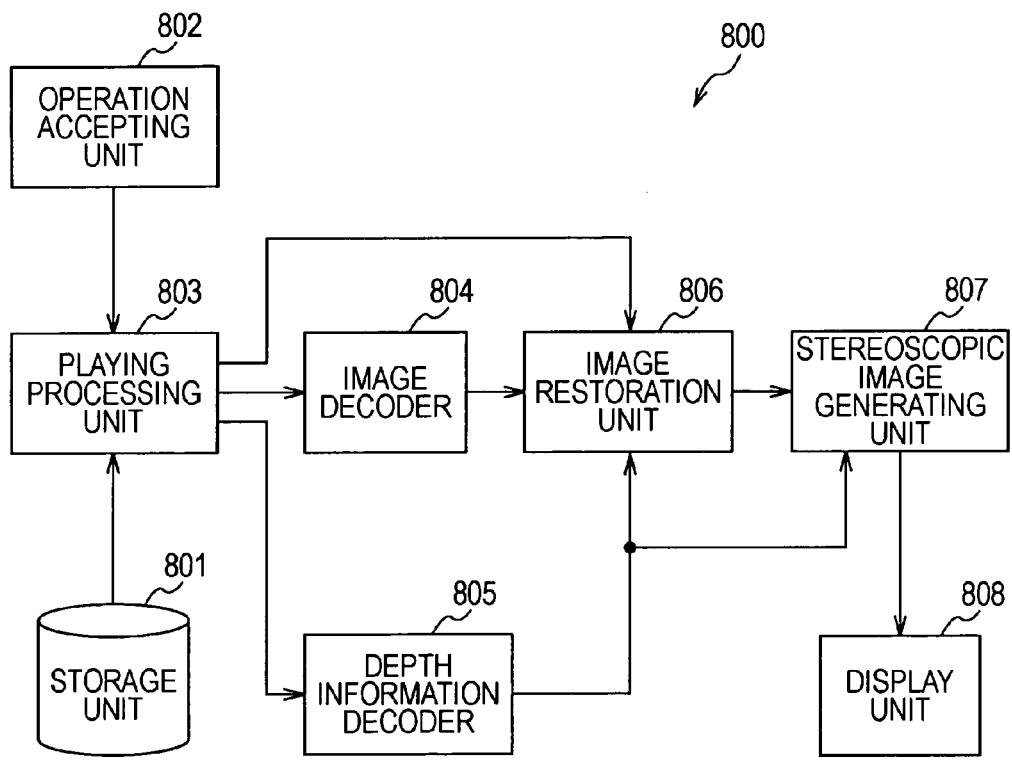
FIG. 22 is a block diagram illustrating a functional configuration example of a player according to the first embodiment of the present invention.

FIG. 22 is a block diagram illustrating a functional configuration example of a playing device 800 according to the first embodiment of the present invention. The playing device 800 includes a storage unit 801, an operation accepting unit 802, a playing processing unit 803, an image decoder 804, a depth information decoder 805, an image restoration unit 806, a stereoscopic image generating unit 807, and a display unit 808. The playing device 800 can be realized by, for example, a playing device of a personal computer or the like capable of playing moving image files recorded by a digital video camera or the like.

The storage unit 801 is a storage unit for storing information such as moving image files, moving image management files, and so on, and supplies the information stored therein to the playing processing unit 803. Note that the playing device 800 corresponds to the storage unit 200 shown in FIG. 1.

The operation accepting unit 802 is an operation accepting unit for accepting input of operations from the user, and outputs the contents of operations in accordance with the operation input that has been accepted, to the playing processing unit 803. For example, in the event that a setting operation, for setting a stereoscopic image playing mode wherein a moving image is played to display a stereoscopic image, has bee accepted, output is made to the playing processing unit 803 to that effect. Also, in the event that a pressing operation of pressing a playing start button is accepted in the state that the stereoscopic image playing mode has been set, output is made to the playing processing unit 803 to that effect.

In the event of playing a moving image file stored in the storage unit 801, the playing processing unit 803 performs processing relating to playing. For example, in the event of accepting a pressing operation of pressing a playing start button in the state that the stereoscopic image playing mode has been set, the playing processing unit 803 obtains the moving image file relating to the pressing operation, and the moving image management file relating hereto, from the storage unit 801. The playing processing unit 803 determines whether or not the obtained moving image file can display a stereoscopic image, based on the stereoscopic image identification information and depth map presence/absence information included in the obtained moving image file. In the event that the obtained moving image file can display a stereoscopic image, the playing processing unit 803 outputs an instruction to generate a restored image to the image restoration unit 806. The playing processing unit 803 also stores the AV stream corresponding to the obtained moving image file in the stream buffer, and sequentially supplies video streams corresponding to the stereoscopic main image and stereoscopic difference image to the image decoder 804. Also, the playing processing unit 803 sequentially supplies the data stream corresponding to the depth maps to the depth information decoder 805.

The image decoder 804 is for decoding the stereoscopic main images and stereoscopic difference images (i.e., video streams) output from the playing processing unit 803, and outputs decoded stereoscopic main images and stereoscopic difference images to the image restoration unit 806.

The depth information decoder 805 is for decoding the depth maps (data stream) output from the playing processing unit 803, and outputs the decoded depth maps to the image restoration unit 806 and stereoscopic image generating unit 807.

The image restoration unit 806 uses the stereoscopic main image and stereoscopic difference image output from the image decoder 804 to generate a restored image in the state before being the difference image processing of the stereoscopic difference image. The image restoration unit 806 then takes the generated restored image as a right eye viewing image and the stereoscopic main image as a left image, and outputs these to the stereoscopic image generating unit 807. Note that an arrangement may be made wherein restoration is performed using the depth maps output from the depth information decoder 805. Generating of a restored image will be described in detail with reference to FIG. 23.

The stereoscopic image generating unit 807 generates a stereoscopic image based on the left eye viewing image and right eye viewing image output from the image restoration unit 806 and the depth maps for each of the images output from the depth information decoder 805. For example, in the case of displaying a stereoscopic image using a liquid crystal display capable of displaying stereoscopic images with the parallax barrier method, a stereoscopic image is generated wherein the pixels of the left eye viewing image and right eye viewing image are alternately arrayed. With this liquid crystal display, parallax barriers having slit-shaped openings, for example, are disposed. Also, in the event of displaying a stereoscopic image using an autostereoscopic display capable of performing autostereoscopic display using multi-view images (e.g., 8-view images) a stereoscopic image with eight parallaxes for the left and right is generated based on the left eye viewing image and right eye viewing image, and the depth maps relating to each image. The stereoscopic image generating unit 807 then outputs the generated stereoscopic image to the display unit 808 for display.

The display unit 808 sequentially displays stereoscopic images generated by the stereoscopic image generating unit 807. An example of the display unit 808 is the above-described liquid crystal display capable of displaying stereoscopic images, or the like.

Example of Generating a Restored Image.

Figure 23A:
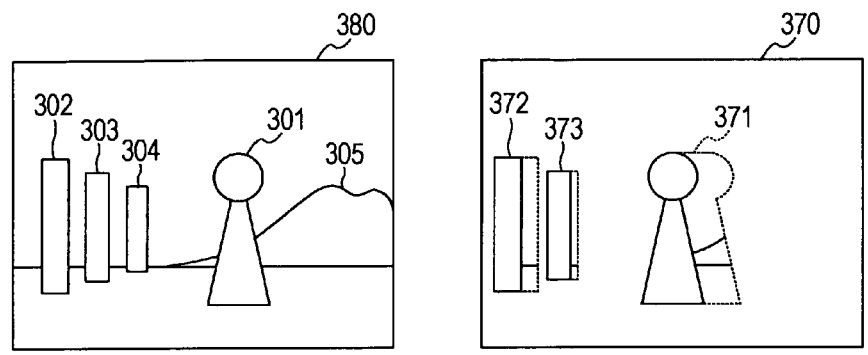
FIGS. 23A through 23C are diagrams schematically illustrating the flow of a restored image generating method wherein a restored image is generated by an image restoration unit according to the first embodiment of the present invention using a stereoscopic main image and a stereoscopic difference image.
Figure 23B:
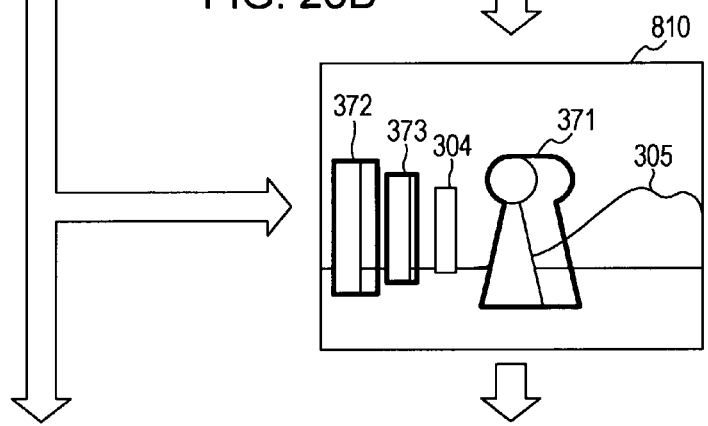
Figure 23C:
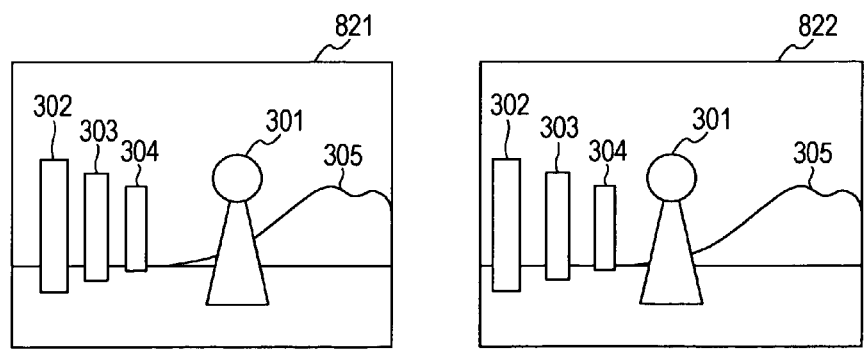

FIGS. 23A through 23C are diagrams schematically illustrating the flow of a restored image generating method wherein a restored image from the stereoscopic difference image is generated by the image restoration unit 806 according to the first embodiment of the present invention using a stereoscopic main image and a stereoscopic difference image. FIG. 23A illustrates a stereoscopic main image 380 and stereoscopic difference image 370 recorded in a moving image file stored in the storage unit 801 in a correlated manner. Note that the stereoscopic main image 380 and stereoscopic difference image 370 shown in FIG. 23a are the same as those shown in FIG. 9C.

FIG. 23B illustrates a restored image 810 generated using the stereoscopic main image 380 and stereoscopic difference image 370. For example, the stereoscopic main image 380 and stereoscopic difference image 370 recorded in the moving image file in a correlated manner are decoded by the image decoder 804. The image restoration unit 806 then generates the restored image 810 using the decoded stereoscopic main image 380 and stereoscopic difference image 370. Specifically, the image restoration unit 806 extracts the images in the regions to be recorded 371 through 373 in the stereoscopic difference image 370, and performs overwriting synthesizing of the extracted image onto the stereoscopic main image 380. That is to say, the restored image 810 is an image generated using the background region of the stereoscopic main image 380, as the background region (other than the regions of the regions to be recorded 371 through 373) for the stereoscopic difference image 370. Note that in FIG. 23B, the regions to be recorded 371 through 373 in the restored image 810 are indicated with the outlines thereof in heavy lines. Next, as shown in FIG. 23C, the stereoscopic main image 380 is taken as a left eye viewing image 821, the generated restored image 810 is taken as a right eye viewing image 822, and the stereoscopic image generating unit 807 generates a stereoscopic image and the generated stereoscopic image is displayed on the display unit 808 as a moving image.

Thus, in the event of generating a restored image, the close-distance subjects and the images of the surrounding regions thereof, included in the stereoscopic difference image, and the background image of the stereoscopic main image, are used to perform restoration. Accordingly, a stereoscopic image which is not unnatural and is visually appealing can be displayed for the background display nearby close-distance subjects in the stereoscopic image.

Example of Operation of the Playing Device

Figure 24:
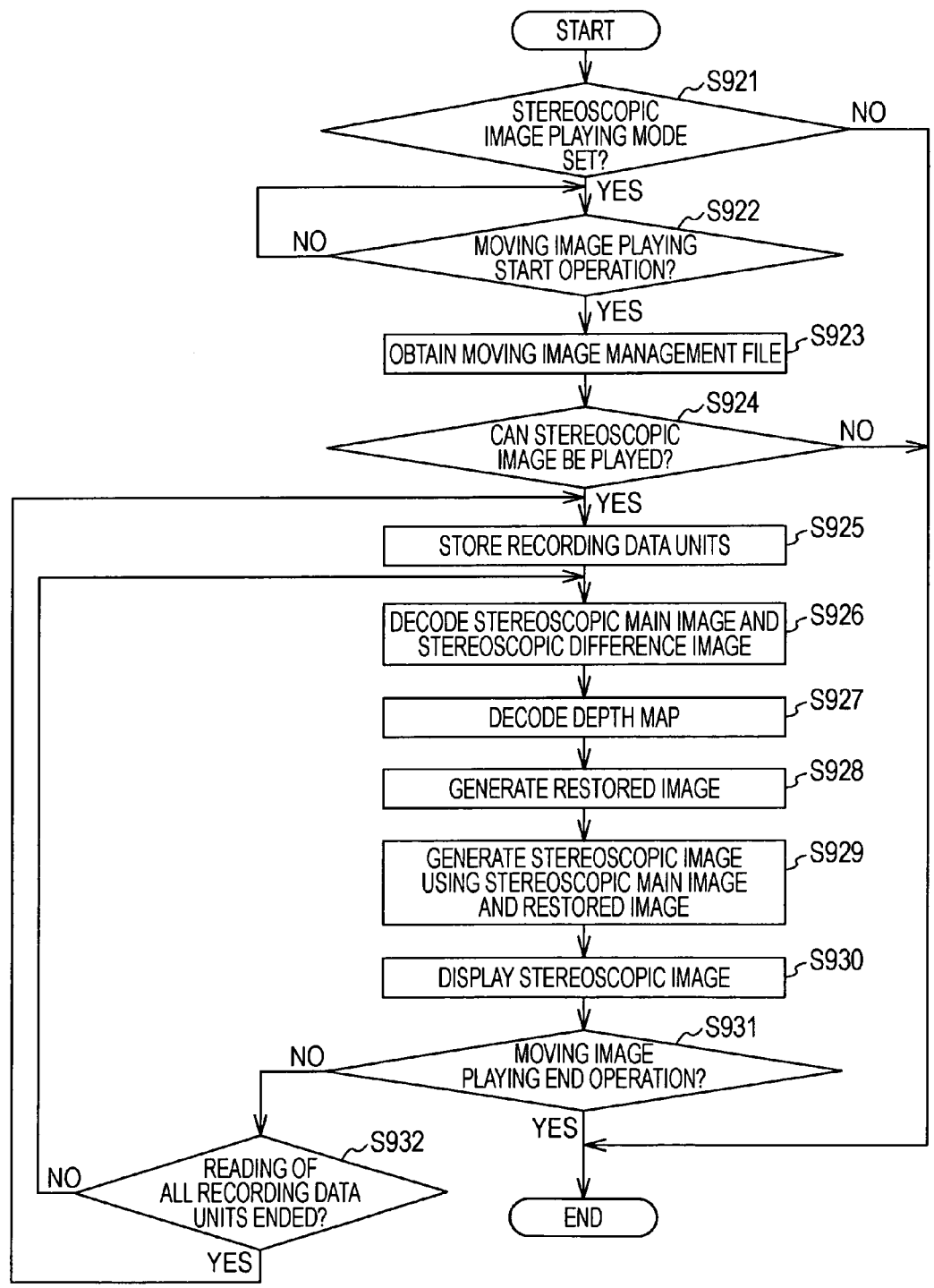
FIG. 24 is a flowchart illustrating processing procedures of moving image playing processing performed by the player according to the first embodiment of the present invention.

FIG. 24 is a flowchart illustrating processing procedures for moving image playing processing by the playing device 800 according to the first embodiment of the present invention. In this example, description will be made regarding moving image playing processing where a moving image file, in which a stereoscopic main image and stereoscopic difference image are stored in a correlated manner, is played as a stereoscopic image.

First, determination is made regarding whether or not a stereoscopic image playing mode for playing a moving image to display a stereoscopic image has been set (step S921). In the event that determination is made in step S921 that the stereoscopic image playing mode has not been set, the operations for the moving image playing processing end.

On the other hand, in the event that determination is made in step S921 that the stereoscopic image playing mode has been set, determination is made regarding whether or not a moving image playing start operation has been performed (step S922). For example, determination is made regarding whether or not a pressing operation of pressing a playing start button has been accepted in a state with the stereoscopic image playing mode set. In the event that determination is made in step S922 that moving image playing start operation has not been performed, monitoring is continued until the starting operations is accepted.

In the event that determination is made in step S922 that moving image playing start operation has been performed, the playing processing unit 803 obtains a moving image management file relating to the moving image file regarding which the starting operation was made (step S923).

Next, determination is made regarding whether or not the moving image file is a moving image file with which a stereoscopic image can be played (step S924). For example, determination is made regarding whether or not "1" is recorded for the stereoscopic image identification information and depth map presence/absence information. In the event that determination is made in step S924 that the moving image file is not a moving image file with which a stereoscopic image can be played, the operations of the moving image playing processing end. On the other hand, in the event that determination is made in step S924 that the moving image file is a moving image file with which a stereoscopic image can be played, the playing processing unit 803 obtains the recording data units of the moving image file regarding which the starting operation has been made, and stores in the stream buffer (step S925).

Next, the image decoder 804 decodes the data corresponding to the stereoscopic main images and stereoscopic difference images included in the recording data units stored in the stream buffer (step S926).

Subsequently, the depth information decoder 805 decodes data corresponding to the depth maps included in the recording data units stored in the stream buffer (step S927).

Next, the image restoration unit 806 generates a restored image using the decoded stereoscopic main image and stereoscopic difference image (step S928).

Subsequently, the stereoscopic image generating unit 807 takes the stereoscopic main image as the left eye viewing image and the generated restored image as the right eye viewing image, and generates a stereoscopic image (step S929).

This generated stereoscopic image is displayed on the display unit 808 as a moving image (step S930).

Next, determination is made regarding whether or not a moving image playing end operation has been performed (Step S931). For example, determination is made in a state in which moving image playing is being performed in the stereoscopic image playing mode, regarding whether or not a pressing operation for pressing the play stop button has been performed.

In the event that determination is made in step S931 that a moving image playing end operation has not been performed, determination is made regarding whether or not reading processing has ended for all recording data units stored in the stream buffer (step S932).

In the event that determination is made in step S932 that reading processing has ended for all recording data units stored in the stream buffer, the flow returns to step S925. On the other hand, in the event that determination is made in step S932 that reading processing has not ended for all recording data units stored in the stream buffer, the flow returns to step S926.

In the event that determination is made in step S931 that a moving image playing end operation has been performed, the moving image playing processing operations end.

Thus, in a case of generating a restored image using a stereoscopic main image and stereoscopic difference image to display a stereoscopic image, the AVCHD format can be used. With the AVCHD format, access control management to stream contents at the time of performing dubbing authoring is relatively easy, assuming performing content dubbing authoring of HD video stream contents to a Blu-ray disc following shooting. Also, an arrangement may be made wherein a stereoscopic image is displayed using one flat screen a depth map when shooting with MP4 which is an HD video format. Also, these display methods may be switched between by user operations. For example, an expression relating to depth for MPEG-C part3 for display devices (Depth-Map definition conversion expression) can be used as a display method of stereoscopic images using a depth map.

2. Second Embodiment

An example has been described above wherein a moving image for displaying a stereoscopic image is recorded and the recorded moving image is played. With the second embodiment, an example will be described where a stereoscopic image is displayed as a monitoring image, in a case of displaying a monitoring image while recording a moving image for displaying a stereoscopic image. Note that a monitoring image is a an image generated by imaging operations in a moving image recording standby state, with the imaged image being displayed in real-time.

Configuration Example of Imaging Apparatus

Figure 25:
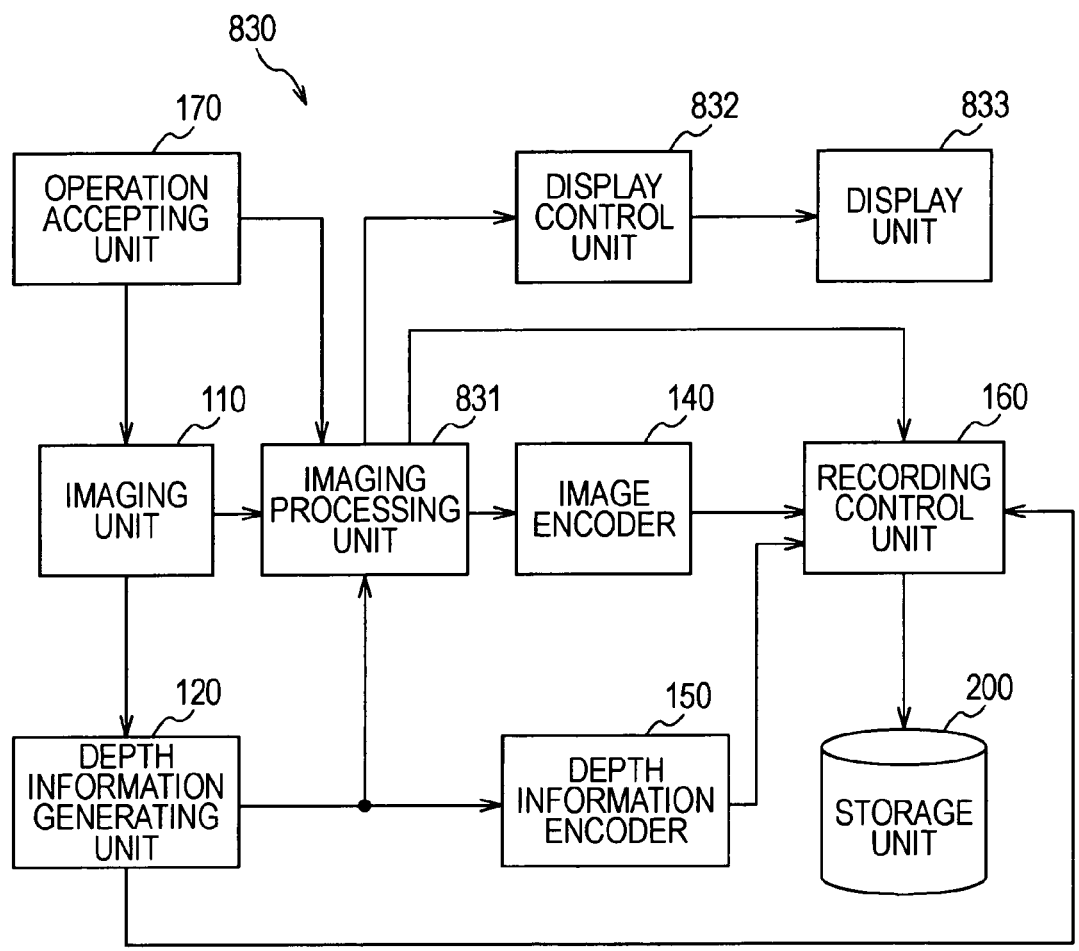
FIG. 25 is a block diagram illustrating a functional configuration example of an imaging device according to a second embodiment of the present invention.

FIG. 25 is a block diagram illustrating a functional configuration example of an imaging apparatus 830 according to the second embodiment of the present invention. Here, the imaging apparatus 830 is a modification of the imaging apparatus 100 shown in FIG. 1, and accordingly description of the portions which are the same as those in the imaging apparatus 100 will be omitted, and description will be primarily given regarding the portions which differ from the imaging apparatus 100. The imaging apparatus 830 has an image processing unit 831, a display control unit 832, and a display unit 33.

The imaging unit 110 is an imaging unit capable of handling stereoscopic imaging, the same as with the arrangement in FIG. 1, and images a subject to generate two imaged images (image data), with the two generated imaged images being output to the depth information generating unit 120 and image processing unit 831. For example, in the event of being in an imaging operation state of displaying only a monitoring image, the imaging unit 110 generates one or the other of a left eye viewing image and right eye viewing image, and outputs the generated one imaged image to the depth information generating unit 120 and image processing unit 831. That is to say, in the case of being in an imaging operation state of displaying only monitoring images, single-view imaging operations are performed. In the event that only image imaged image is generated, the depth information generating unit 120 generates a depth map for the one imaged image.

In the event of being in an imaging operation state of displaying only monitoring images, two images are generated for displaying a stereoscopic image for the imaged images output from the imaging unit 110, based on the depth map output from the depth information generating unit 120. The image processing unit 831 then outputs the two generated images to the display control unit 832. Note that other image processing is the same as the example shown in FIG. 1, so description thereof will be omitted here. The method for generating the two images for displaying a stereoscopic image will be described in detail with reference to FIGS. 26 through 27C.

The display control unit 832 displays a stereoscopic image on the display unit 833 in real-time, based on the two images output from the image processing unit 831. The display unit 833 displays the imaged image generated by the imaging unit 110 in real-time as a stereoscopic image, based on the control of the image processing unit 830. Note that a stereoscopic image display device such as a liquid crystal panel capable of displaying stereoscopic images by the above-described parallax barrier method or the like, can be used as the display unit 833. For example, in the event that the imaging apparatus 830 is relatively small, a stereoscopic image display device of a relatively small liquid crystal panel or the like can be used, in accordance with the size thereof.

Example of Generating Stereoscopic Image

Figure 26:
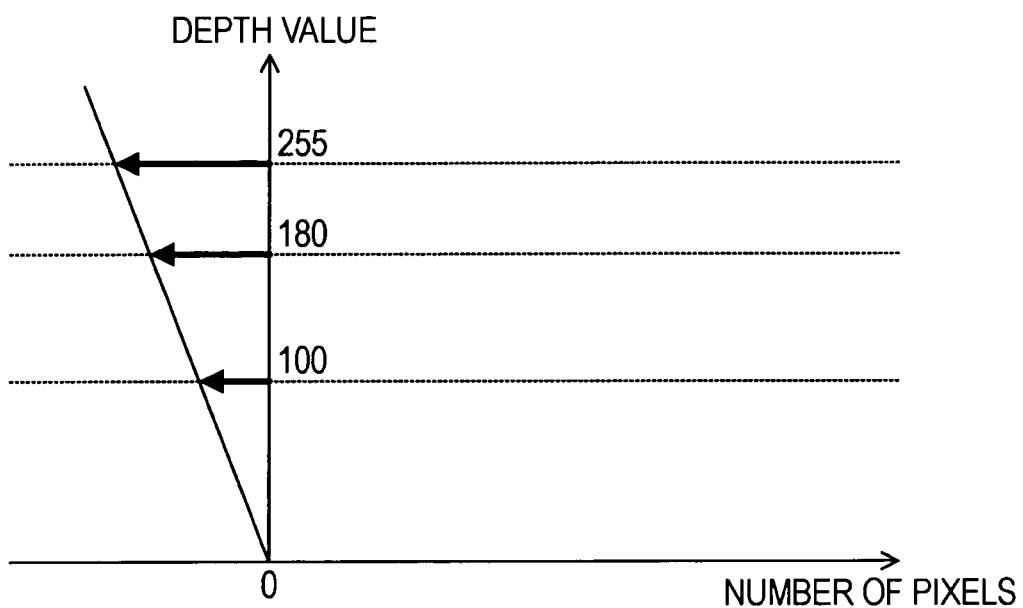
FIG. 26 is a diagram illustrating the relation between depth value of a subject relating to a stereoscopic image generated by the an image processing unit according to the second embodiment of the present invention and pixel values for identifying a region to which to move the subject.

FIG. 26 is a diagram illustrating the relation between the depth value of a subject relating to a stereoscopic image generated by the image processing unit 831 according to the second embodiment of the present invention, and the pixel value for identifying the region to which to move the subject. In the graph shown in FIG. 26, the vertical axis represents the depth value calculated regarding the subject included in the imaged image, and the horizontal axis represents the length for identifying the region to which the subject should move, in pixels. Note that the graph shown in FIG. 26 corresponds to the graph shown in FIG. 7, and other than the amount of pixel value being opposite on the horizontal axis, is the same graph as that shown in FIG. 7.

FIGS. 27A through 27C are drawings schematically illustrating a stereoscopic image generating method in a case of the image processing unit 831 according to the second embodiment of the present invention generating a right eye viewing image from the imaged image 311. Note that the imaged image 311 is the same as the imaged image (left eye) 311 shown in FIG. 2C, and accordingly has been denoted with the same reference numeral.

FIG. 27B schematically illustrates a case of having moved the region of the person 301, and posts 302 and 303 in accordance with the graph shown in FIG. 26. Note that in FIG. 27B, the regions after moving 841 through 843 are indicated by hatching therein, and the regions 844 through 846 including the subjects before and after moving are indicated by the outline having a heavy line. The amount of movement is also indicated by arrows.

Now, a specific method for calculation relating to moving of the close-distance subjects, and a method for calculating the gap region generated by the close-distance moving, will be described. First, the method for calculation relating to moving of the close-distance subjects will be described. The image processing unit 831 calculates sections corresponding to regions on each line following the close-distance subjects having moved in the imaged image to be handled, using Expression 2 below. Now, let us say that the section in one horizontal line in the imaged image 311 for a close-distance subject (e.g., the person 301) is a section O10 (expressed as [011, 012]). The origin of the horizontal line in the imaged image 311 is the left edge. Also, the section O10 is a closed interval wherein a depth value exceeding 0 continues. In this case, a section R10 which is a region corresponding to the close-distance subject after moving, on the one horizontal line on the imaged image to be handled, is detected using the following Expression 2. Now, the depth value of the close-distance subject in the section O10 will be called D10. Note that in the event that the depth value D10 is not uniform in the section O10, the section R10 is calculated using the depth value which occurs the greatest number of times within the section O10. Also, an arrangement may be made wherein the average value of each depth value in the section O10 is calculated, and the section R10 is calculated using the average value.

$$R10=[O11-k10 \cdot D10, O12-k10 \cdot D10] \quad (2)$$

where k10 is a constant for identifying the amount of motion in the horizontal direction of the subject of interest, serving as a conversion offset coefficient k10 ($0 \leq k10 < 1$) for parallax, identified following the graph shown in FIG. 26.

Next, a method for calculating the background region regarding which a gap occurs due to the close-distance subjects moving, will be described. The image processing unit 831 calculates sections corresponding to the gap regions occurring due to the close-distance subjects moving, on each line in the imaged image to be handled according to the expression below. For example, a section R20 corresponding to the gap region on one horizontal line in the imaged image to be handled due to the close-distance subjects moving, is calculated using the following Expression 3. Note that the section O10, depth value D10, and conversion offset coefficient k10, are the same as those described above.

$$R20=[O12-K10 \cdot D10, O12] \quad (3)$$

In the example shown in FIG. 27B, the regions following the close-distance subjects moving, obtained with Expression 2, are regions 841 through 843. The background regions obtained using Expression 3 are white regions in the regions 844 through 846 (i.e., regions other than the region 841 through 843). As shown in FIG. 27B, the image processing unit 831 extracts the close-distance subjects from the imaged image 311, and moves the close-distance subjects that have been extracted according to Expression 2. Accordingly, by extracting the close-distance subjects from the imaged image 311 and moving them, the regions to the right side of the close-distance subjects following moving are regions with no image information (gap regions). The image processing unit 831 then performs interpolation processing for the gap regions occurring due to the close-distance subjects moving. For example, interpolation processing can be performed for the gap regions using the image nearby (near to the gap) included in a frame within a predetermined range on the temporal axis. Note that in the event that there is no image suitable nearby included within the predetermined range on the temporal axis, spatial interpolation within the screen of the imaged image to be interpolated can be performed.

FIG. 27C illustrates a left eye viewing image 311 and a right eye viewing image 850 generated from the imaged image 311. Note that the left eye viewing image 311 is the same as the imaged image 311, and accordingly is denoted with the same reference numeral. The right eye viewing image 850 is an image obtained by the close-distance images moving in accordance with Expression 2, and interpolation processing being performed regarding the gap regions calculated following Expression 3. In the right eye viewing image 850, the regions 851 through 853 correspond to the regions 841 through 843 in FIG. 27B, and the regions 854 through 856 correspond to the regions 844 through 846 in FIG. 27B. Note that in FIG. 27C, the outlines of regions 854 through 856 are indicated by dotted lines.

Thus, a left eye viewing image 311 and right eye viewing image 850 are generated from one imaged image 311, and a stereoscopic image can be displayed using the generated left eye viewing image 311 and right eye viewing image 850. Accordingly, in the event of displaying a monitoring image when recording a moving image, or in a moving image recording standby state, a stereoscopic image can be displayed as a monitoring image using an imaged image generated by a single view. Note that the right eye viewing image making up the stereoscopic image displayed in this way is generated by a part of the background image being subjected to interpolation processing, and accordingly the background image may be different to the actual image. However, a monitoring image is an image to be displayed in real-time on a display panel provided to the imaging apparatus 830, and is an image for the user to confirm moving image recording, for example. Accordingly, this arrangement has been made assuming that there will be little effect on the user even if a relatively simple stereoscopic image is displayed.

Thus, by generating a right eye viewing image making up the stereoscopic image, a stereoscopic image can be easily displayed using a single-view imaging unit. Also, stereoscopic images can be generated by image processing, so stereoscopic images can be generated with electronic devices such as a small digital cameras or cell phones or the like having a single-view imaging unit. Also, an arrangement may be made wherein the left eye viewing image and right eye viewing image making up the stereoscopic image generated with such electronic devices are sequentially recorded as a moving image, as described with the first embodiment, and played as stereoscopic images in a play mode. For example, with the right eye viewing image making up the stereoscopic image, the close-distance subject regions and gap regions alone may be sequentially recorded, with a restored image being generated in the playing mode, to play a stereoscopic image using the restored image and left eye viewing image. Further, an arrangement may be made wherein these recorded moving images are displayed as stereoscopic images with other display devices as well.

3. Third Embodiment

Figure 28:
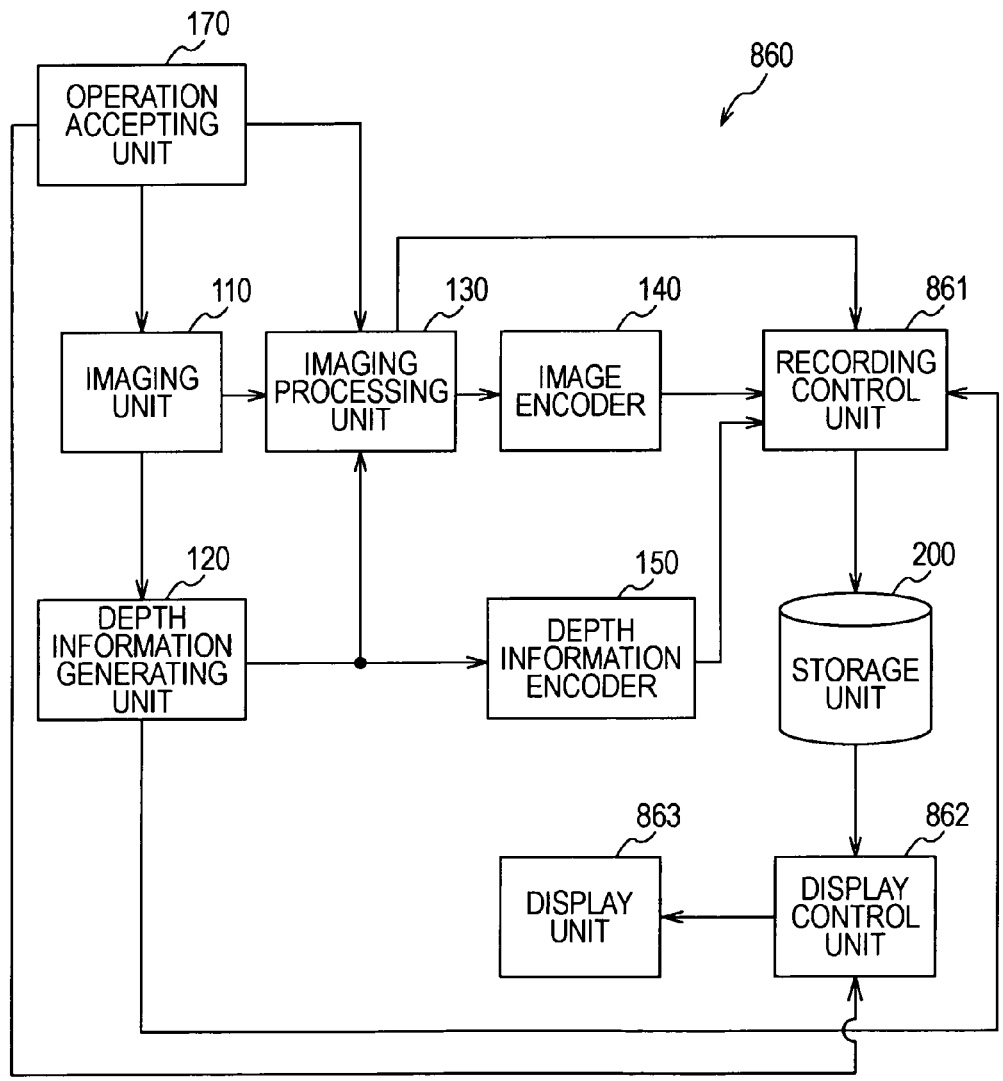
FIG. 28 is a block diagram illustrating a functional configuration example of an imaging device according to a third embodiment of the present invention.

Examples of recording processing and playing processing for displaying a stereoscopic image have been described above. Now, there may be cases wherein, in the event that multiple moving image files for displaying stereoscopic images are stored, the user will want to display a list of the moving image files and select a desired moving image file. In this case, there may be cases wherein moving image files for displaying stereoscopic images and moving image files for displaying flat images are stored together. In a case wherein multiple types of moving image files are stored together, an arrangement which allows the user to view a list in which different types of moving image files are shown differently would enable the user to easily comprehend the moving image files being displayed as a list. Accordingly, with the third embodiment, an example of displaying a thumbnail image of a stereoscopic image for moving image files for displaying stereoscopic images will be described.
Configuration Example of Imaging Apparatus FIG. 28 is a block diagram illustrating a functional configuration example of an imaging apparatus 860 according to the third embodiment of the present invention. The imaging apparatus 860 is a modification of the imaging apparatus 100 shown in FIG. 1, and accordingly description of the portions which are the same as those in the imaging apparatus 100 will be omitted, and description will be primarily given regarding the portions which differ from the imaging apparatus 100. The imaging apparatus 830 has a recording control unit 861, a display control unit 862, and a display unit 863.

The image processing unit 130 outputs, of the two imaged images output from the imaging unit 110 (left eye viewing image and right eye viewing image), two imaged images corresponding to a representative frame, to the recording control unit 861. The representative frame may be the top frame.

The recording control unit 861 records the two imaged images output from the image processing unit 130 (left eye viewing image and right eye viewing image) that correspond to the representative frame, in the storage unit 200 so as to be included in the moving image management file as thumbnail images for displaying a stereoscopic image. The recording method of these will be described in detail with reference to FIG. 29.

The display control unit 862 displays a content selection screen for selecting a moving image file stored in the storage unit 200 in accordance to operation input from the operation accepting unit 170, on the display unit 863. A list of thumbnail images included in the moving image management file stored in the storage unit 200 are displayed in this content selection screen. Also, thumbnail images corresponding to moving image files for displaying stereoscopic images are displayed as stereoscopic images. A display example of the content selection screen is shown in FIG. 30.

Figure 29A:
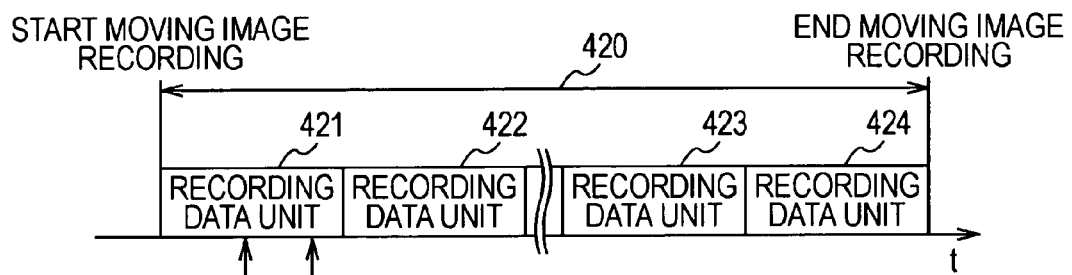
FIGS. 29A through 29C are diagrams schematically illustrating recording processing of thumbnail images by a recording control unit according to the third embodiment of the present invention.
Figure 29B:
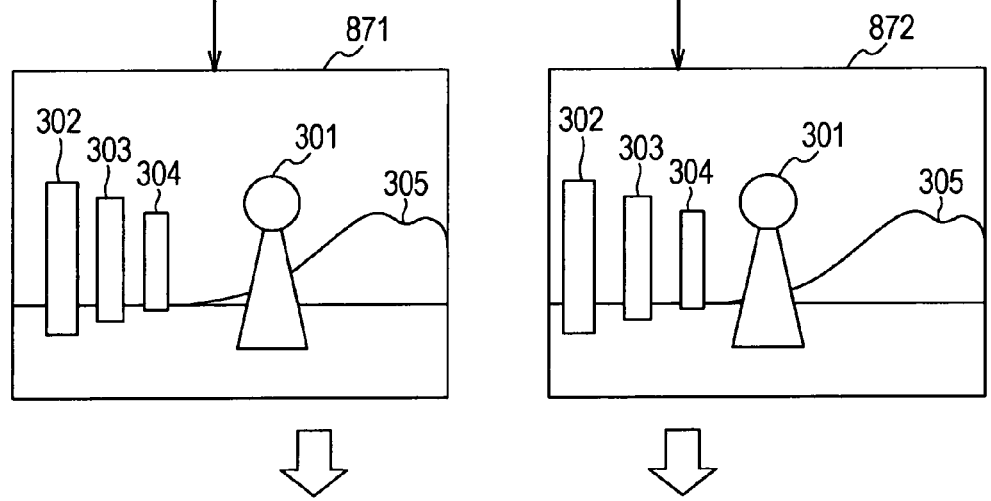
Figure 29C:
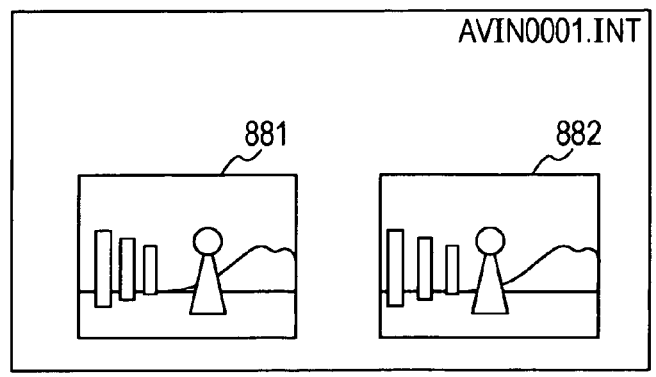

The display unit 863 displays the content section screen under the control of the display control unit 862. Note that a stereoscopic image display device such as a liquid crystal panel capable of displaying stereoscopic images by the above-described parallax barrier method or the like, can be used as the display unit 863. For example, in the event that the imaging apparatus 860 is relatively small, a stereoscopic image display device of a relatively small liquid crystal panel or the like can be used, in accordance with the size thereof.
Example of Recording Thumbnail Image FIGS. 29A through 29C are diagrams schematically illustrating recording processing of thumbnails by the recording control unit 861 according to the third embodiment of the present invention. FIG. 29A schematically illustrates recording data units 421 through 424 making up one moving image file, in time sequence. Note that the recording data units 421 through 424 are the same as those shown in FIG. 11A, and accordingly are denoted with the same reference numerals.

FIG. 29B illustrates thumbnail images recorded in the moving image management file stored in the storage unit 200. The thumbnail images are made up of a left eye viewing image 871 and right eye viewing image 872. The left eye viewing image 871 and right eye viewing image 872 are a left eye viewing image and right eye viewing image corresponding to a playing display point-in-time (also called "Presentation Time Stamp" or "PTS") of a representative frame of the frames making up the moving image file. For example, the thumbnail images shown in FIG. 29B correspond to the two images (imaged image (left eye) 311 and imaged image (right eye) 312) shown in FIG. 29B. The thumbnail images shown in FIG. 29B may be the left eye viewing image and right eye viewing image of the top frame of the frames making up the moving image file, for example.

Figure 30A:
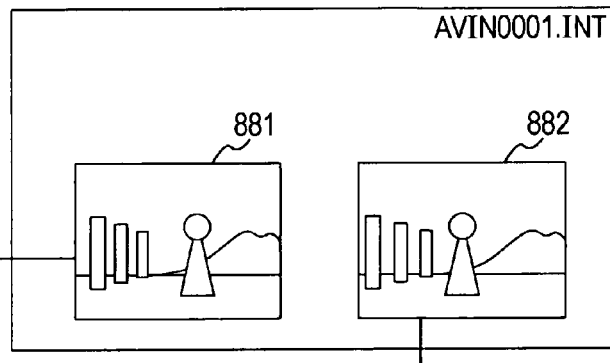
FIGS. 30A through 30C are diagrams schematically illustrating display processing of thumbnail images by a display control unit according to the third embodiment of the present invention.
Figure 30B:
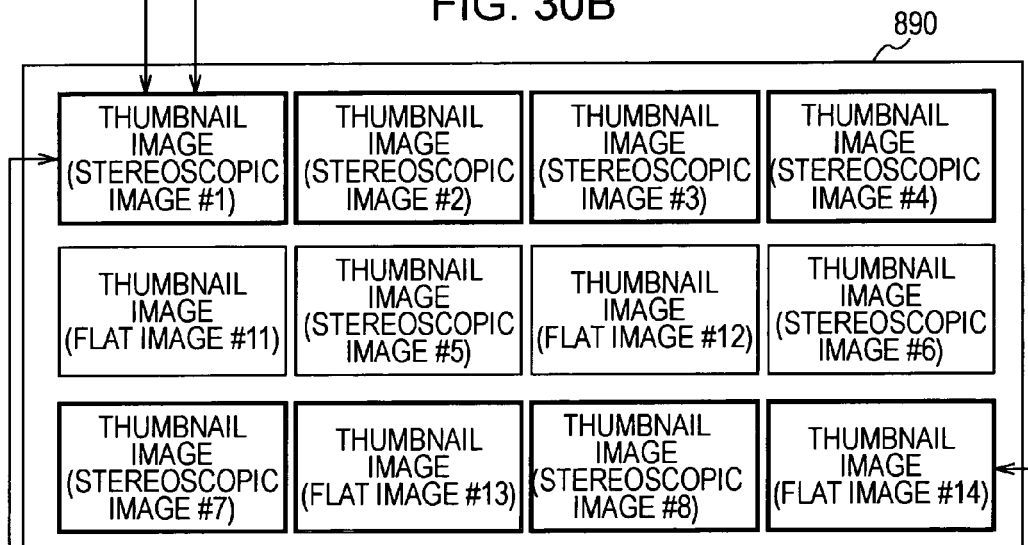
Figure 30C:
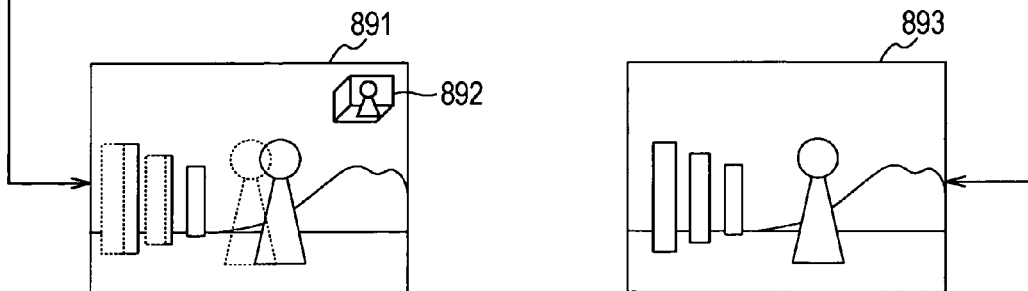

FIG. 29C schematically illustrates a case where a thumbnail image has been recorded in a moving image file. For example, the thumbnail images 881 and 882 are recorded in the file "AVIN0001.INT" 543 shown in FIG. 13. The thumbnail images 881 and 882 correspond to the left eye viewing image 871 and right eye viewing image 872 shown in FIG. 29B.
Example of Displaying Thumbnail Image FIGS. 30A through 30C are diagrams schematically illustrating display processing of thumbnails by the display control unit 862 according to the third embodiment of the present invention. FIG. 30A schematically illustrates a case wherein thumbnail images are recorded in the moving image management file. Note that the moving image management file and thumbnail images shown in FIG. 30A are the same as those shown in FIG. 29C, and accordingly are denoted with the same reference numerals.

FIG. 30B illustrates a content selection screen 890 displayed in the event of selecting a moving image file stored in the storage unit 200. This content selection screen 890 is a screen for displaying a list of thumbnail images representing the moving image files, and by selecting a thumbnail image included in this screen, the moving image file corresponding to the selected thumbnail image can be played. FIG. 30B illustrates an example of moving image files for displaying stereoscopic images and moving image files for displaying flat images being stored in the storage unit 200, with the thumbnail images representing each of the moving image files being displayed in the same screen. In the content selection screen 890 shown in FIG. 30B, the thumbnail images of moving image files for displaying stereoscopic images are displayed as stereoscopic images, and the thumbnail images of moving image files for displaying flat images are displayed as flat images. Note that in FIG. 30B, rectangles representing the thumbnail images displayed as stereoscopic images (stereoscopic images #1 through #8) are indicated by heavy borders, and rectangles representing the thumbnail images displayed as flat images (flat images #1 through #14) are indicated by light borders.

FIG. 30C illustrates a display example of thumbnail images displayed in the content selection screen 890. A thumbnail image (stereoscopic image) 891 is a thumbnail image representing a moving image file for displaying a stereoscopic image, and as shown in FIG. 30A, is displayed as stereoscopic image by one set of thumbnail images. Note that in FIG. 30C, the thumbnail image (stereoscopic image) 891 is illustrated in a simplified manner. Now, in the event that a moving image file corresponding to a thumbnail image displayed in the content selection screen 890 is a moving image file for displaying a stereoscopic image, an emblem indicating this is overlaid on the displayed thumbnail image in the content selection screen 890. For example, a stereoscopy icon 892 is overlaid on the thumbnail image 891 and displayed.

Also, a thumbnail image (flat image) 893 is a thumbnail image representing a moving image file for displaying a flat image, and is displayed as a flat image. Note that in FIG. 30C, the thumbnail image (flat image) 893 is shown in a simplified manner, with a layout generally the same as that of the thumbnail image (stereoscopic image) 891.

Thus, in the case of displaying moving image files capable of displaying stereoscopic images in a content selection screen, the thumbnail images can be displayed as stereoscopic images, and also a stereoscopy icon can be overlaid on the thumbnail image. Accordingly, the user can readily comprehend moving image files capable of playing stereoscopic images when selecting desired moving image files. Also, displaying thumbnail images corresponding to the representative frames of the moving image files allows the user to readily comprehend the 3-D nature of the moving image when played, beforehand.

Thus, according to embodiments of the present invention, a data stream wherein stereoscopic main images and stereoscopic difference images are correlated is recorded as a moving image file, so the storage capacity for storing moving image files for displaying stereoscopic images can be reduced. Also, at the time of playing, stereoscopic images are generated based on the stereoscopic main images and stereoscopic difference images, and these can be played as a moving image. Further, depth maps are included in the data stream along with the stereoscopic main images and stereoscopic difference images and recorded as a moving image file, whereby stereoscopic images can be generated using the depth maps at the time of playing. Further, stereoscopic image identification information and depth map presence/absence information is included in the data stream or moving image management file and recorded, whereby stereoscopic images can be displayed using this information.

Note that the embodiments of the present invention can be applied to image processing devices such as cell phones with imaging functions, personal computers with imaging functions, and so on. Also, with an imaging processing system wherein an imaging apparatus and an image processing device are connected by an interface, the embodiments of the present invention can be applied to cases of recording moving images generated by the imaging apparatus in a recording device by the imaging processing device.

It should be noted that the embodiments of the present invention are only examples of carrying out the present invention, and there is correlation between matter described in the embodiments and particular matter in the Claims. In the same way, there is correlation between the particular matter in the Claims and the matter in the embodiments with the same names. However, the present invention is not restricted to the embodiments, and various modifications can be made without departing from the spirit and scope of the present invention.

Also, the processing procedures described in the embodiments may be understood as a method having a series of procedures, or may be understood as a program for causing a computer to execute the series of procedures and/or a recording medium storing the program. A recording medium which can handle random access for file recording, for example, can be used as the recording medium, examples of which include CD (Compact Disc), MD (MiniDisc), DVD (Digital Versatile Disc), memory cards, Blu-ray discs according to various media formats, SSD (Solid State Drive), and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an imaging unit configured to generate an imaged image by imaging a subject;
a depth information generating unit configured to generate depth information relating to said imaged image;
an image processing unit configured to
extract, from said imaged image, an image of an object region including a particular subject out of subjects included in said imaged image and a surrounding region of said subject, based on said depth information, and
generate a difference image to display a stereoscopic image in which said subjects included in said imaged image are viewed stereoscopically based on said extracted image; and
a recording control unit configured to
generate a data stream in which data corresponding to said imaged image and data corresponding to said difference image are correlated, and
record said data stream as a moving image file,
wherein said imaging unit generates a first imaged image and a second imaged image, in which one of said first imaged image and said second imaged image is a stereoscopic main image and in which the stereoscopic image is formed from the stereoscopic main image and the difference image, and
wherein said image processing unit (i) identifies a common region included in the first imaged image and the second imaged image which lies within a second subject region which extends from a second distance to a third distance from a position of the image processing apparatus at a time of imaging by use of said depth information, and (ii) generates the difference image from a portion or portions of the other of said first imaged image and said second imaged image which are not in the common region such that the difference image is generated from the portion or portions of the other of said first imaged image and said second imaged image which are only within a first subject region which extends from a first distance to the second distance from the position of the image processing apparatus at the time of imaging, in which the third distance is greater than the second distance and the second distance is greater than the first distance.

2. The image processing apparatus according to claim 1, wherein said recording control unit generates said data stream including stereoscopic image identification information indicating that data corresponding to said difference image is to be included.

3. The image processing apparatus according to claim 2, wherein said recording control unit generates, according to the AVCHD Standard, said data stream including said stereoscopic image identification information in a modified digital video pack according to the AVCHD Standard.

4. The image processing apparatus according to claim 1, wherein said recording control unit records a moving image management file managing said moving image file, including stereoscopic image identification information indicating that data corresponding to said difference image is included in said moving image file.

5. The image processing apparatus according to claim 4, wherein said recording control unit records a moving image management file including said stereoscopic image identification information in at least one of
 an index file,
 a clip information file, and
 a movie playlist file,
according to the AVCHD Standard.

6. The image processing apparatus according to claim 1, wherein said recording control unit generates said data stream correlating data corresponding to said imaged image and data corresponding to said difference image and data corresponding to said depth information.

7. The image processing apparatus according to claim 6, wherein said recording control unit generates said data stream including depth map presence/absence information indicating that data corresponding to said depth information is to be included.

8. The image processing apparatus according to claim 7, wherein said recording control unit generates, according to the AVCHD Standard, said data stream including said depth map presence/absence information in a modified digital video pack according to the AVCHD Standard.

9. The image processing apparatus according to claim 6, wherein said recording control unit records a moving image management file managing said moving image file, including depth map presence/absence information indicating that said moving image file includes data corresponding to said depth information.

10. The image processing apparatus according to claim 9, wherein said recording control unit records a moving image management file including said depth map presence/absence information in at least one of
 an index file,
 a clip information file, and
 a movie playlist file,
according to the AVCHD Standard.

11. The image processing apparatus according to claim 6, wherein said recording control unit
 defines a registration region for a play item of said depth information in an extended data region in a movie playlist file according to the AVCHD Standard, and
 records said play item of said depth information in said registration region.

12. The image processing apparatus according to claim 1, wherein said recording control unit correlates a first thumbnail image corresponding to said first imaged image and a second thumbnail image corresponding to said second imaged image, for displaying a representative image representing said moving image file as a stereoscopic image, and records in a moving image management file managing said moving image file.

13. The image processing apparatus according to claim 12, further comprising:
 a display control unit configured to perform a list display of a representative image representing said moving image file, based on said first thumbnail image and said second thumbnail image recorded in said moving image management file.

14. An imaging processing method comprising the steps of:
 first generating, of an imaged image by imaging a subject;
 second generating, of depth information relating to said imaged image;
 extracting, from said imaged image, an image of an object region including a particular subject out of subjects included in said imaged image and a surrounding region of said subject, based on said depth information;
 third generating, of a difference image to display a stereoscopic image in which said subjects included in said imaged image are viewed stereoscopically based on said extracted image;
 fourth generating, of a data stream in which data corresponding to said imaged image and data corresponding to said difference image are correlated, and
 recording of said data stream as a moving image file,
 wherein said first generating step generates a first imaged image and a second imaged image, in which one of said first imaged image and said second imaged image is a stereoscopic main image and in which the stereoscopic image is formed from the stereoscopic main image and the difference image, and
 wherein said extracting and third generating steps include (i) identifying a common region included in the first imaged image and the second imaged image which lies within a second subject region which extends from a second distance to a third distance from a position of the image processing apparatus at a time of imaging by use of said depth information, and (ii) generating the difference image from a portion or portions of the other of said first imaged image and said second imaged image which are not in the common region such that the difference image is generated from the portion or portions of the other of said first imaged image and said second imaged image which are only within a first subject region which extends from a first distance to the second distance from the position of the image processing apparatus at the time of imaging, in which the third distance is greater than the second distance and the second distance is greater than the first distance.

15. A program stored on a non-transitory computer-readable medium for causing a computer to execute the steps of:
 first generating, of an imaged image by imaging a subject;
 second generating, of depth information relating to said imaged image;
 extracting, from said imaged image, an image of an object region including a particular subject out of subjects included in said imaged image and a surrounding region of said subject, based on said depth information;
 third generating, of a difference image to display a stereoscopic image in which said subjects included in said imaged image are viewed stereoscopically based on said extracted image;

fourth generating, of a data stream in which data corresponding to said imaged image and data corresponding to said difference image are correlated, and recording of said data stream as a moving image file, wherein said first generating step generates a first imaged image and a second imaged image, in which one of said first imaged image and said second imaged image is a stereoscopic main image and in which the stereoscopic image is formed from the stereoscopic main image and the difference image, and wherein said extracting and third generating steps include (i) identifying a common region included in the first imaged image and the second imaged image which lies within a second subject region which extends from a second distance to a third distance from a position of the image processing apparatus at a time of imaging by use of said depth information, and (ii) generating the difference image from a portion or portions of the other of said first imaged image and said second imaged image which are not in the common region such that the difference image is generated from the portion or portions of the other of said first imaged image and said second imaged image which are only within a first subject region which extends from a first distance to the second distance from the position of the image processing apparatus at the time of imaging, in which the third distance is greater than the second distance and the second distance is greater than the first distance.

16. The image processing apparatus according to claim 1, wherein the first distance is 0.5 meters, the second distance is 5.0 meters, and the third distance is infinity, such that the first subject region extends from 0.5 meters to 5.0 meters and the second subject region extends from 5.0 meters to infinity and such that the difference image is generated from the portion or portions of the other of said first imaged image and said second imaged image which are only within the first subject region which extends from 0.5 meters to 5.0 meters.

* * * * *